(12) United States Patent  (10) Patent No.: US 7,999,973 B2
Nakata et al.  (45) Date of Patent: Aug. 16, 2011

(54) IMAGE PROCESSING APPARATUS AND A CONTROL METHOD FOR FORMING FORGERY-INHIBITED PATTERN IMAGES

(75) Inventors: Hiroaki Nakata, Kawasaki (JP);
Masanori Aritomi, Shinjuku-ku (JP);
Tatsuro Uchida, Yokohama (JP);
Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1349 days.

(21) Appl. No.: 11/534,090

(22) Filed: Sep. 21, 2006

(65) Prior Publication Data

US 2007/0091352 A1 Apr. 26, 2007

(30) Foreign Application Priority Data

Oct. 21, 2005 (JP) .................................. 2005-306648
Jul. 19, 2006 (JP) .................................. 2006-196846

(51) Int. Cl.
*H04N 1/40* (2006.01)
(52) U.S. Cl. ............ 358/3.28; 283/113; 380/54; 380/55
(58) Field of Classification Search .................... 283/94, 283/67, 70, 72, 73, 74, 114, 902; 358/1.14, 358/3.28, 1.9; 399/366; 347/132; 430/31; 382/100; 380/54, 55
See application file for complete search history.

(56) References Cited

U.S. PATENT DOCUMENTS

| | | | | |
|---|---|---|---|---|
| 4,210,346 A | * | 7/1980 | Mowry et al. ................... | 283/94 |
| 5,255,014 A | * | 10/1993 | Haneda et al. ................ | 347/132 |
| 5,380,610 A | * | 1/1995 | Haneda et al. ................ | 430/31 |
| 2003/0142331 A1 | * | 7/2003 | Tanaka ............................ | 358/1.9 |
| 2004/0150859 A1 | * | 8/2004 | Hayashi ........................ | 358/1.14 |
| 2004/0184065 A1 | * | 9/2004 | Guan et al. .................... | 358/1.14 |
| 2005/0058476 A1 | * | 3/2005 | Murakami .................... | 399/366 |
| 2005/0078974 A1 | | 4/2005 | Uchida et al. | |
| 2005/0152006 A1 | * | 7/2005 | Abe et al. ..................... | 358/1.14 |
| 2005/0162682 A1 | * | 7/2005 | Aritomi et al. ............... | 358/1.14 |
| 2005/0174596 A1 | * | 8/2005 | Uchida et al. ................ | 358/1.14 |
| 2005/0219634 A1 | * | 10/2005 | Murakami .................... | 358/3.28 |
| 2007/0065208 A1 | | 3/2007 | Uchida et al. | |

FOREIGN PATENT DOCUMENTS

| | | |
|---|---|---|
| JP | 2005-094327 A | 4/2005 |
| JP | 2005-107777 A | 4/2005 |
| JP | 2005-136954 A | 5/2005 |
| JP | 2005-151456 A | 6/2005 |
| JP | 2005-236954 A | 9/2005 |

* cited by examiner

*Primary Examiner* — Twyler L Haskins
*Assistant Examiner* — Nicholas Pachol
(74) *Attorney, Agent, or Firm* — Canon U.S.A., Inc. I.P. Division

(57) ABSTRACT

A method of controlling an apparatus which is capable of determining a dot disposition of a copy-forgery-inhibited pattern image is disclosed. The copy-forgery-inhibited pattern image has a latent image area in which a number of first dots and a number of second dots smaller than the first dots are disposed and a background area in which a number of the second dots are disposed. The first dots can be reproduced when copied. The method includes displaying information related to a disposition of the first dots and the second dots in the latent image area, setting a rate of the first dots that are disposed in the latent image area, or a rate of the second dots that are disposed in the latent image area, in accordance with a designation performed by a user, and determining the dot disposition in the latent image area in accordance with the setting of the rate.

15 Claims, 19 Drawing Sheets

| 6 | 7 | 8 | 9 |
|---|---|---|---|
| 5 | 0 | 1 | 10 |
| 4 | 3 | 2 | 11 |
| 15 | 14 | 13 | 12 |

| 0 | 8 | 2 | 10 |
|---|---|---|----|
| 12 | 4 | 14 | 6 |
| 3 | 11 | 1 | 9 |
| 15 | 7 | 13 | 5 |

VISUALIZATION

IMAGE PROCESSING APPARATUS AND A CONTROL METHOD FOR FORMING FORGERY-INHIBITED PATTERN IMAGES

BACKGROUND OF THE INVENTION

1. Field of the Invention

The present invention relates to an image processing apparatus that is capable of combining a copy-forgery-inhibited pattern image and an original image so as to output a combined image, and to a method of controlling the information processing apparatus.

2. Description of the Related Art

There are special sheets called forgery-inhibited sheets or security paper. In a forgery-inhibited sheet, a string of characters, such as "COPY", is invisibly hidden at a glance. However, the hidden string of characters appears on a copy of the forgery-inhibited sheet. Thus, a document produced using such a forgery-inhibited sheet, can easily be discerned from its copy. Also, to use a copy of such document can cause hesitation.

Forgery-inhibited sheets have the above advantages. Therefore, forgery-inhibited sheets have been utilized to make ledger sheets, resident cards, and so on. However, forgery-inhibited sheets have drawbacks in that they are high in price, as compared with sheets of plain paper, and that only strings of characters hidden in the forgery-inhibited sheet at the time of its production can appear on a copy sheet.

In view of the above mentioned drawbacks associated with forgery-inhibited sheets, in recent years, a new technique having advantages similar to those of forgery-inhibited sheets has attracted attention. According to this technique, document data and copy-forgery-inhibited pattern (also referred to as copy-inhibited pattern) image data generated by a computer are synthesized in a printer, and the pattern-containing-image data obtained by this synthesis is output to a sheet of standard paper. A string of characters, or the like is hidden in this copy-forgery-inhibited pattern image. Thus, the hidden string of characters appears on a copy of the pattern-containing-image, similar to the case of using a forgery-inhibited sheet. Additionally, since this technique utilizes a sheet of standard paper, this technique has an advantage in that an original can be produced inexpensively, as compared with the case of utilizing a forgery-inhibited sheet. Also, according to this technique, new copy-forgery-inhibited pattern image data can be generated every time an original document is produced. Thus, this technique has another advantage in that the color of a copy-forgery-inhibited pattern image and a hidden string of characters can be freely set.

Meanwhile, this copy-forgery-inhibited pattern image includes an area in which an image "remains (appears)" on the copy, and an area in which an image "disappears" on the copy (or the density of this area is lower, as compared with the former area). These two areas have substantially the same reflection density on the original. Thus, the human eye cannot recognize that a string of characters, such as "COPY", is hidden in the original. The word "remain" means that an image on an original is exactly reproduced on a copy. Further, the word "disappear" means that an image on an original is not reproduced on a copy. The reflection density is measured by a reflection densitometer.

Hereinafter, the area, in which an image "remains" on the copy, is referred to as a "latent image area". The area, in which an image "disappears" on the copy (or the density of this area is lower, as compared with the former area), is referred to as a "background area".

FIG. 19 is a view showing an arrangement of dots in a copy-forgery-inhibited pattern image. In FIG. 19, an area in which dots are arranged in a concentrated manner, is a latent image area. An area in which dots are arranged in a dispersed manner, is a background area. Dots shown on each of the two areas are formed by different halftone dot processes or different dithering processes. For example, the dots of the latent image area are formed by a low resolution screen processing. The dots of the background area are formed by a high resolution screen processing. Alternatively, the dots of the latent image area are formed using a dot-concentrated-type dither matrix. The dots of the background area are formed using a dot-dispersed-type dither matrix.

Meanwhile, the reproduction ability of a copying machine depends on the input resolution and the output resolution of the copying machine. Thus, there is a limit to the reproduction ability of the copying machine. Consequently, in the case where the dots of the latent image area of the copy-forgery-inhibited pattern image are larger than dots that can be reproduced by a copying machine, and where the dots of the background area of the copy-forgery-inhibited pattern image are smaller than dots that can be reproduced by the copying machine, the dots of the latent image area on a copy can be reproduced, however the dots of the background area are difficult to reproduce. As a result, the latent image area is densely reproduced on the copy in comparison with the background area. Hereinafter, a phenomenon is called "visualization" in which a hidden string of characters appears just as floating on a copy because the latent image area is densely reproduced in comparison with the background area.

FIGS. 20A and 20B are views illustrating this "visualization". FIGS. 20A and 20B conceptually illustrate that concentrated dots (large dots) are reproduced on a copy, and that dispersed dots (small dots) are not exactly reproduced thereon.

The configuration of the copy-forgery-inhibited pattern image is not limited to the aforementioned configuration. It is sufficient that strings of characters recognizable to the human eyes, such as "COPY", symbols, or patterns appear (or are visualized) on a copy. Also in the case where the string of white characters, such as "COPY" is shown on a colored area, this copy-forgery-inhibited pattern image substantially achieves its purpose. In this case, the region of the characters "COPY" is called the "background area".

As described above, a technique for making the latent image less visible has been developed. In addition, Japanese Patent Application Laid-Open No. 2005-151456 discusses a technique in which large and small dots are disposed in the latent image area in a mixed manner in order to make the latent image less visible on the original. In this technique, the latent image area is divided into plural regions. Disposition of the dots is controlled such that the dots to be reproduced at the time of copying are disposed in at least one region among the plural regions, and the dots are not disposed in at least one region other than the region in which the dots are disposed. In this way, the latent image is less visible in the original, compared to the conventional technology in which only the large dots are disposed in the latent image area.

As described above, the technique in which large and small dots are disposed in the latent image area in a mixed manner has been developed, however, an environment such as a user interface (UI) for utilizing the technique is not well established yet. For example, according to the technique that Japanese Patent Application Laid-Open No. 2005-151456 discusses, large and small dots are disposed in the latent image in a mixed manner. Consequently, invisibility of the latent image on the original is improved, however, an effect of visualization of the latent image on the copy is reduced, as compared to the technique in which only the large dots are disposed in the latent image area. In order to allow a user to select a desirable technique while the user can recognize the disadvantage described above, an environment for utilizing the technique such as the UI needs to be established. In addition, in order to allow the user to readily change a ratio of large and small dots, also the environment for utilizing the technique such as the UI needs to be established

SUMMARY OF THE INVENTION

According to an aspect of the present invention, a method of controlling an apparatus which is capable of determining a dot disposition of a copy-forgery-inhibited pattern image is provided. The copy-forgery-inhibited pattern image has a latent image area in which a plurality of first dots and a plurality of second dots smaller than the first dots are disposed and a background region in which a plurality of the second dots are disposed. The first dots can be reproduced when copied. The method includes displaying information related to a disposition of the first dots in the latent image area and a disposition of the second dots in the latent image area, setting a rate of the first dots that are disposed in the latent image area, or a rate of the second dots that are disposed in the latent image area, in accordance with a designation performed by a user, and determining the dot disposition in the latent image area in accordance with the setting of the rate.

According to another aspect of the present invention, an apparatus that is capable of determining a dot disposition of a copy-forgery-inhibited pattern image is provided. The copy-forgery-inhibited pattern image has a latent image area in which a plurality of first dots and a plurality of second dots smaller than the first dots are disposed and a background area in which a plurality of the second dots are disposed. The first dots can be reproduced when copied. The apparatus includes a displaying unit adapted to display information related to disposition of the first dots in the latent image area and disposition of the second dots in the latent image area, a setting unit adapted to set a rate of the first dots that are disposed in the latent image area, or a rate of the second dots that are disposed in the latent image area in accordance with a designation performed by a user, and a dot disposition determination unit adapted to determine the dot disposition in the latent image area in accordance with the setting of the rate performed by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
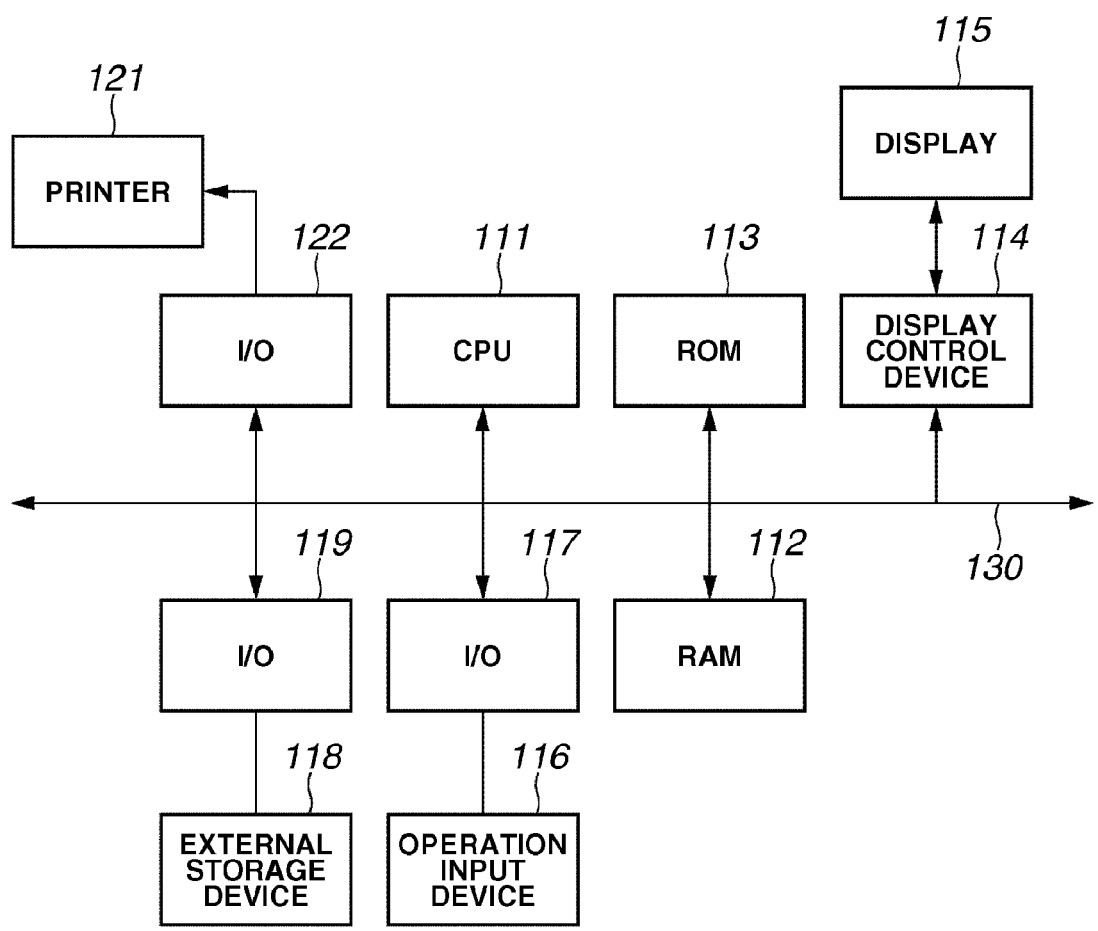
FIG. 1 is a diagram that illustrates a configuration of a printing system according to an embodiment of the present invention.

FIG. 1 is a block diagram that illustrates a printing system according to an embodiment. Referring to FIG. 1, the printing system includes a host computer and a printer 121.

First, the host computer is described. A CPU 111 controls processes that are performed by the host computer, using a program module and data stored in a RAM 112 and a ROM 113. The RAM 112 includes an area in which the program and the data loaded from an external storage device 118 are temporarily stored, and also includes an area that is necessary for the CPU 111 to perform various kinds of processings. The ROM 113 stores a functional program and setting data of the computer. A display control device 114 performs control to allow a display 115 to display images and characters. A CRT or a liquid crystal screen can be used as the display 115. An operation input device 116 includes a device such as a keyboard and a mouse by which various kinds of instructions can be inputted to the CPU 111. An I/O unit 117 notifies the various kinds of instructions inputted through the operation input device 116 to the CPU 111. The external storage device 118 such as a hard disk functions as a large-capacity information storage medium, and stores a program that allows the CPU 111 to perform each processing. Writing of information to the external storage device 118 and reading the information from the external storage device 118 are performed via an I/O unit 119.

A printer 121 outputs a document and the image. Data is sent from the RAM 112 or the external storage device 118 to the printer 121 via an I/O unit 122.

A bus 130 connects the CPU 111, the RAM 112, the ROM 113, the display control device 114 the I/O unit 117, the I/O unit 119, and the I/O unit 122.

copy-forgery-inhibited pattern printing processing performed by the host computer as shown in FIG. 1 is described with reference to a diagram shown in FIG. 2.

Figure 2:
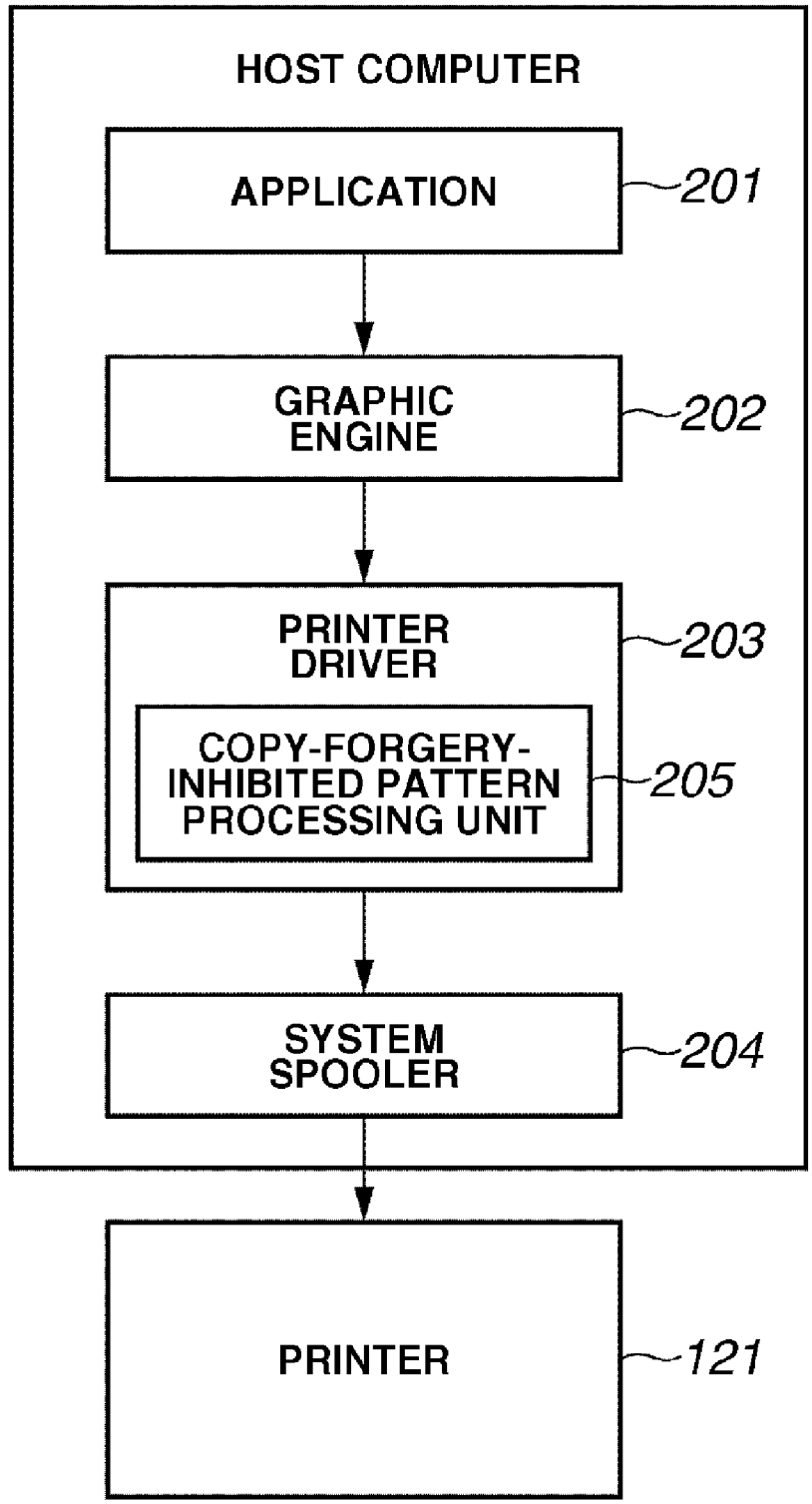
FIG. 2 is a diagram that illustrates a configuration of a software module in a host computer according to an embodiment of the present invention.

Referring to FIG. 2, an application 201, a graphic engine 202, a printer driver 203, and a system spooler 204 exist in a form of a file (program module) that is stored in the external storage device 118. These program modules are loaded to the RAM 112 and executed by an OS. The application 201 and the printer driver 203 can be added to the external storage device 118 via an FD (not shown), a CD-ROM (not shown), or a network (not shown).

Next, a flow of the copy-forgery-inhibited pattern printing processing is described. First, a user opens a user interface for the printer driver 203 through the application 201 and interactively performs a setting for the copy-forgery-inhibited pattern using dialogs 301, 401, and 501, which are shown in FIGS. 3 through 5C.

The application 201 produces a graphic device interface (GDI) function and transfers the produced function to the graphic engine 202. At this time, the graphic engine 202 is loaded to the RAM 112 and executable.

The graphic engine 202 loads the printer driver 203 to the RAM 112 from the external storage device 118. The graphic engine 202 converts the received GDI function into a device drive interface (DDI) function, and then outputs the DDI function to the printer driver 203.

The printer driver 203 transfers the setting for the copy-forgery-inhibited pattern, to a copy-forgery-inhibited pattern processing unit 205 in the printer driver. More specifically, the printer driver 203 transfers the setting for the copy-forgery-inhibited pattern to a copy-forgery-inhibited pattern processing unit 205 after converting the setting into parameters that the copy-forgery-inhibited pattern processing unit 205 can interpret.

The copy-forgery-inhibited pattern processing unit 205 performs processing for rendering the copy-forgery-inhibited pattern image to produce copy-forgery-inhibited pattern image data. The copy-forgery-inhibited pattern image will be described below. The copy-forgery-inhibited pattern processing unit 205 can be a built-in module of the printer driver 203. In addition, the copy-forgery-inhibited pattern processing unit 205 can have a library module form that is added by an individual installation.

Upon receipt of the GDI function and the copy-forgery-inhibited pattern image data, the printer driver 203 produces a control command (for example, page description language (PDL) data) that the printer can recognize, on the basis of the function and the data.

The printer driver 203 transfers the command to the system spooler 204. At this time, the system spooler 204 is loaded to the RAM 112 by the OS.

The system spooler 204 outputs the received command to the printer 121 via the I/O unit 122.

Hereinbelow, the description is made as to the processing for setting the copy-forgery-inhibited pattern printing, processing for producing the copy-forgery-inhibited pattern image, combining processing, and image forming processing.

<Processing for Setting the Copy-Forgery-Inhibited Pattern Printing>

The processing for copy-forgery-inhibited pattern printing setting is performed by the copy-forgery-inhibited pattern processing unit 205 that is controlled by the CPU 111.

FIG. 3, FIG. 4, and FIGS. 5A through 5C are diagrams that respectively illustrate examples of the user interface used for performing copy-forgery-inhibited pattern printing setting. The data related to the interface screens is stored in the external storage device 118. Thus, when the screens are displayed, the data is temporarily loaded to the RAM 112 and then sent to the display 115 via the display control device 114.

Figure 3:
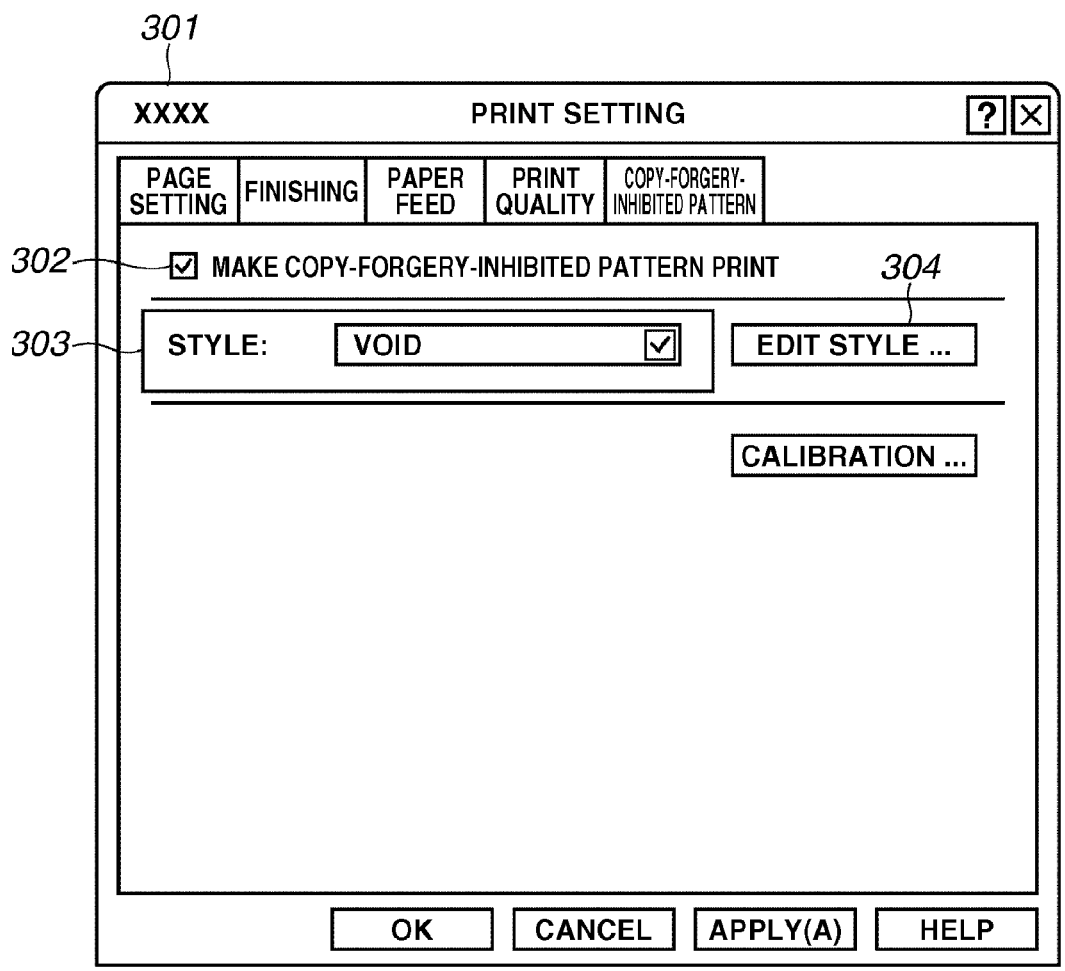
FIG. 3 is a diagram that illustrates an initial screen for copy-forgery-inhibited pattern printing setting according to an embodiment of the present invention.

FIG. 3 is a diagram that illustrates one example of an initial screen for performing the copy-forgery-inhibited pattern printing setting.

The screen as shown in FIG. 3 (a property sheet 301) is displayed when a copy-forgery-inhibited pattern is set. The user can perform the copy-forgery-inhibited pattern printing setting through the initial screen of the printer driver 203 in the property sheet 301. A check box 302 enables a user to select whether copy-forgery-inhibited pattern printing (a function by which a copy-forgery-inhibited pattern image and an original image are combined and outputted) is performed. The information determined using the check box 302 is stored in the RAM 112 as additional printing information. A region 303 enables the user to designate plural registered setting information with one identifier (style). Each of the style information (plural setting information) is registered in a registry (not shown). In addition, by pressing a button 304, a style-editing dialog 401 as shown in FIG. 4 is displayed.

Figure 4:
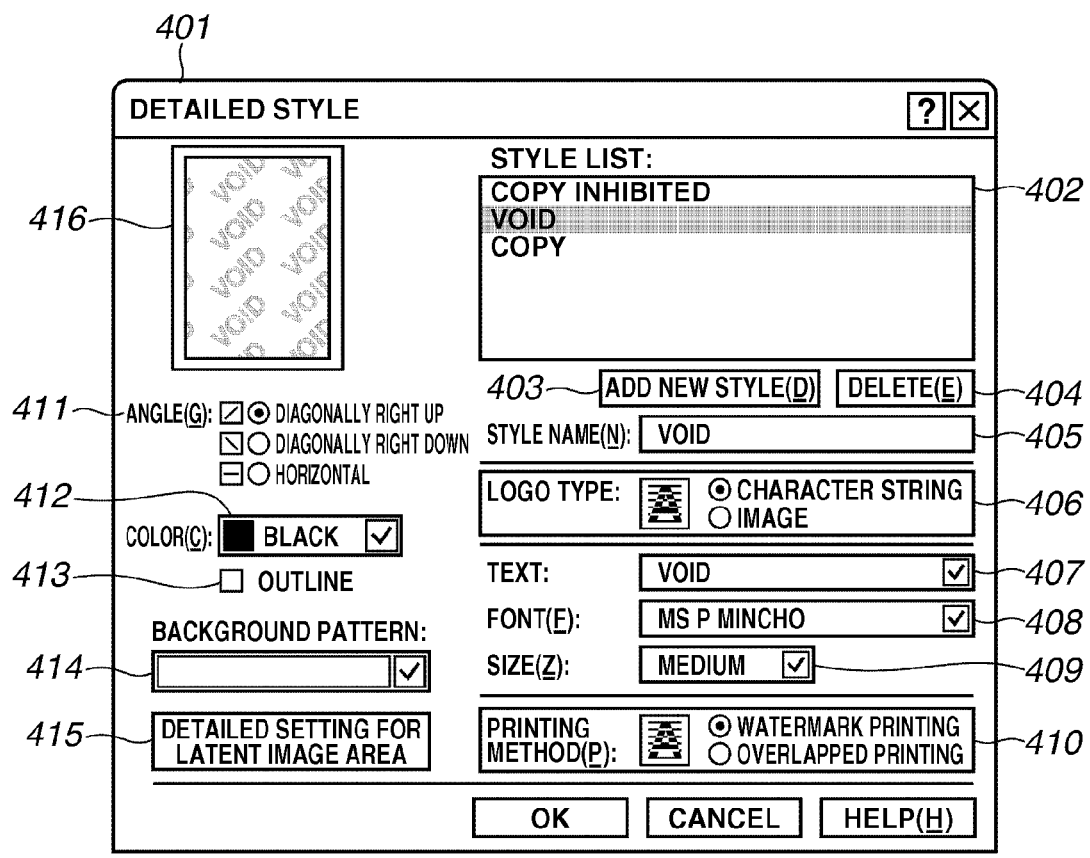
FIG. 4 is a diagram that illustrates a copy-forgery-inhibited pattern style editing screen according to an embodiment of the present invention.

FIG. 4 illustrates one example of a style editing screen for performing the copy-forgery-inhibited pattern printing setting.

Figure 19:
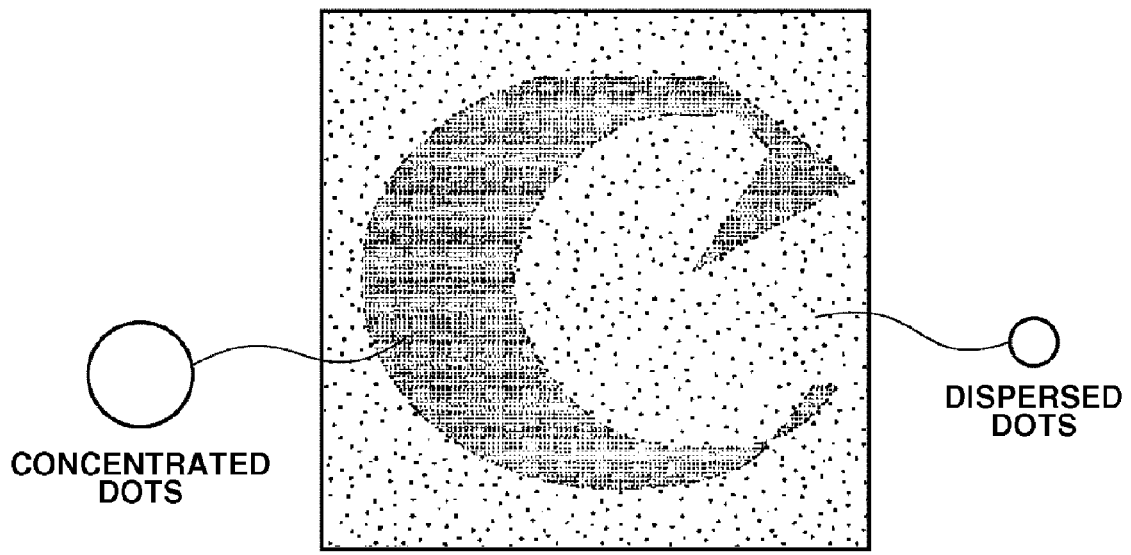
FIG. 19 is a diagram that illustrates a copy-forgery-inhibited pattern image.
Figure 20A:
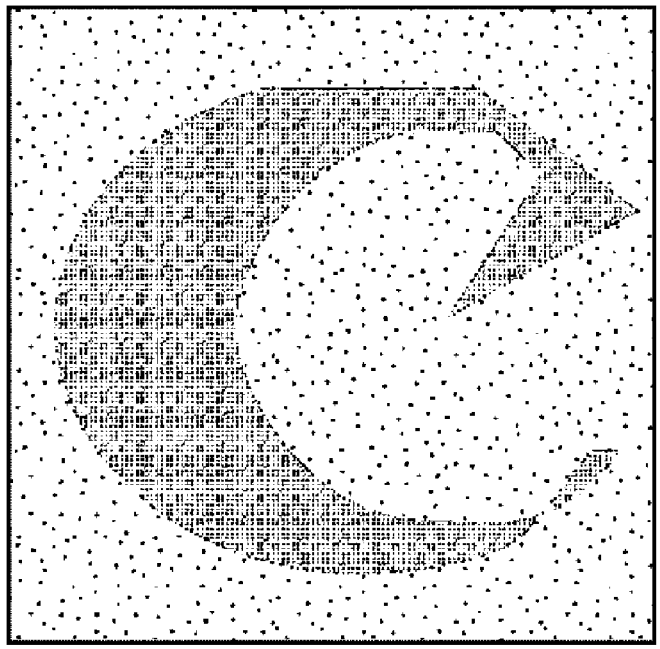
FIG. 20A is a diagram that illustrates the copy-forgery-inhibited pattern image and FIG. 20B is a diagram that illustrates the copy-forgery-inhibited pattern image after being visualized.
Figure 20B:
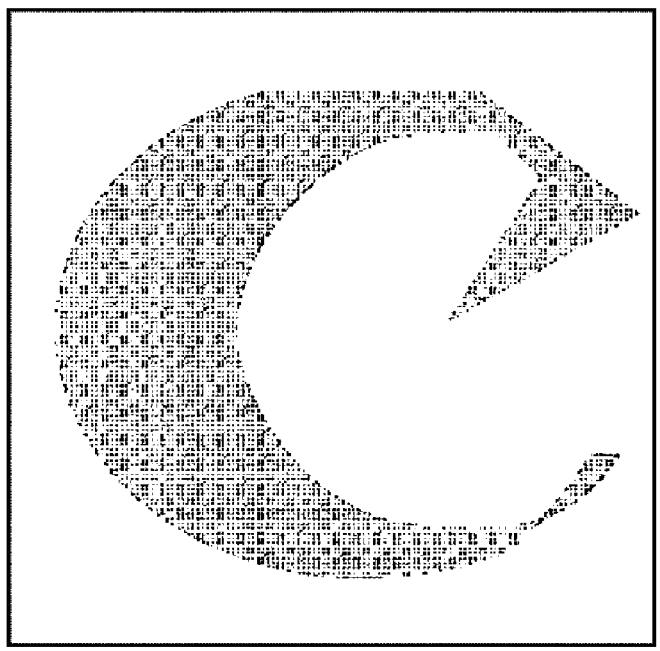

Using the screen as shown in FIG. 4 (a copy-forgery-inhibited pattern information-editing dialog 401), the copy-forgery-inhibited pattern printing setting in each registered style can be performed in detail. A region 416 is a region in which the copy-forgery-inhibited pattern image is displayed as a preview. A region 402 is a region in which a list of styles that can be selected, is displayed. Buttons 403 and 404 can be used to add newly selected style and delete the selected style. A region 405 is a region in which a name of the style currently selected is displayed. A radio button 406 can be used to select a type of object of a latent image (the latent image refers to a character string, graphic, and a logo that appears on a copy: for example, a character string C as shown in FIG. 19). When "character string" is selected using the radio button 406, a text object can be used as the latent image. When "image" is selected, image data such as a BMP can be used as the latent image. In the current screen (the dialog 401 for copy-forgery-inhibited pattern information-editing), the "character string" is selected by the radio button 406, and thus setting information (as indicated by each of reference numerals 407, 408, and 409) concerning the text object is displayed in the screen.

In this way, according to an embodiment, the types of the latent image are the "character string" and the "image", and the user selects one of the "character string" and the "image". However, the kind of the latent image according to the present invention is not limited to this. In addition to them, other suitable types of latent images can also be used. The region 407 is a region in which a latent image character string is displayed and edited. The region 408 is a region in which font information of the character string is displayed and edited. In the illustrated embodiment, only a font name is displayed in the region 408. However, family information of the font (for example, Bold and Italic) and ornamental character information can also be displayed. The region 409 is a region in which a font size of the character sting that is used as the latent image, is displayed and edited. In one embodiment, the font size selectable by the user includes three types, namely, a "large", a "medium", and a "small". However, another commonly used method of designating the font size (the method in which a point size is directly inputted) can be employed. A radio button 410 sets a printing order of the copy-forgery-inhibited pattern image and the original image. When a "watermark printing" is selected using the radio button 410, after the copy-forgery-inhibited pattern image is rendered, the original image is rendered. On the other hand, when an "overlapped printing" is designated, after original data is rendered, the copy-forgery-inhibited pattern is rendered. The "watermark printing" and the "overlapped printing" are described in detail in Japanese Patent Application Laid-Open No. 2005-107777, and therefore, a detailed description thereof is omitted here.

A radio button 411 designates an angle of disposition of the latent image. In the illustrated embodiment, the disposition angle can be selected from among "diagonally right-up", "diagonally right-down", and "horizontal". Alternatively, the latent image angle can be arbitrarily designated or can be designated by a slider bar, instead of selecting from among the three angles of "diagonally right-up", "diagonally right-down", and "horizontal". A region 412 is a region in which a color of the copy-forgery-inhibited pattern image is displayed and edited. A check box 413 is a check box for exchanging a latent image area and a background area. When the check box 413 is not checked, the latent image reproduced in a high density on the copy is the region that shows the latent image such as "VOID". That is, when the check box 413 is not checked, the character string such as the "VOID" appears in a reflective density higher than in surrounding regions.

On the other hand, when the check box 413 is checked, the background reproduced in a low density on the copy is the region that shows the latent image of "VOID". That is, when the check box 413 is checked, the character string such as "VOID" is shown in an outlined manner. In a region 414, a camouflage image is designated which makes the added copy-forgery-inhibited pattern image less recognizable to human eyes. The camouflage image can be selected from among plural patterns. In addition, as an alternative, the camouflage image can be unselected. A detailed background setting button 415 is a button for calling a "detailed background setting". By pressing the detailed background setting button 415, the screen as shown in FIG. 5A is displayed.

Figure 5A:
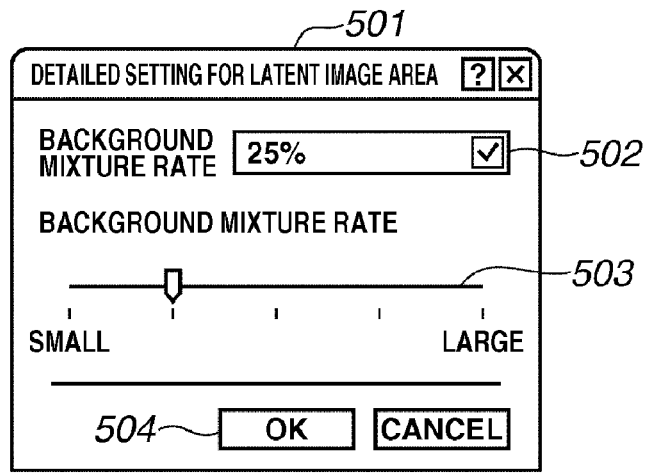
FIG. 5A is a diagram that illustrates a screen for detailed latent image area setting according to a first embodiment of the present invention.

FIG. 5A describes one example of a screen for performing a "detailed latent image area setting" according to a first embodiment of the present invention. The screen 501 of FIG. 5A shows a detailed setting screen for latent image area.

By using the screen as shown in FIG. 5A (a dialog 501 for latent image area setting), a detailed setting for the background can be performed. A combo box 502 (e.g., pulldown menu) can be used to designate a background mixture rate. The background mixture refers to a disposition of both large and small dots in the latent image area, in which only the large dots should originally be disposed. The background mixture rate refers to a rate of small dots that are disposed in the latent image area. The background mixture rate can be otherwise expressed as "100%–rate of large dots disposed in the latent image area" When the user presses the combo box 502, options of "0%", "25%", "50%", and "75%" are displayed in a pop-up manner. For example, when the user selects the background mixture rate of 25%, the large dots are disposed in 75% of the latent image area, and the small dots are disposed in 25% of the latent image area. Of course, in the background area, only the small dots are disposed. By changing the background mixture rate, the copy-forgery-inhibited pattern image each of which gives a different impression of latent image can be outputted.

When the user selects the background mixture rate of 0%, the large dots are disposed in 100% of the latent image area. Here, "the large dots are disposed in 100% of the latent image area" means that only the large dots are disposed in the latent image area and no small dots are disposed. This does not mean that "the large dots are disposed without an interval all over the latent image area". If "the large dots are disposed without an interval all over the latent image area", the latent image area becomes a black copy area.

Figures 10, 11:
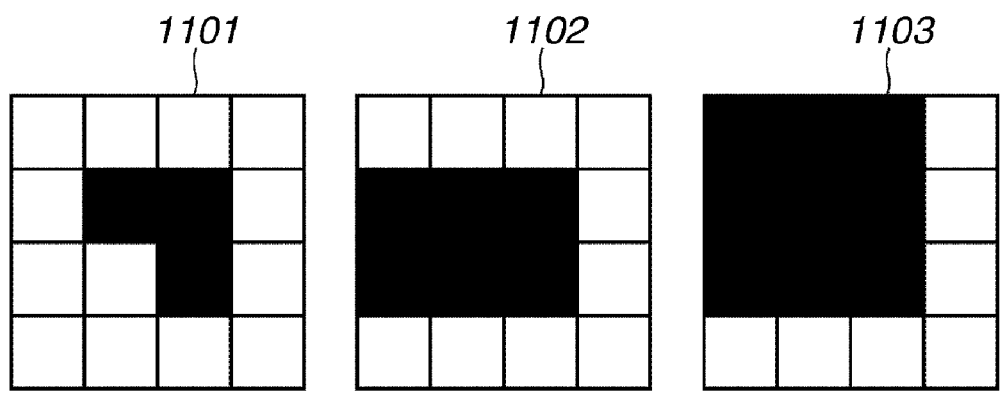
FIG. 10 is a diagram that illustrates one example of a dot-concentrated type dither matrix according to an embodiment of the present invention.
FIG. 11 is a diagram that illustrates dot patterns produced by using the dot-concentrated dither matrix in FIG. 10.
Figures 12, 13:
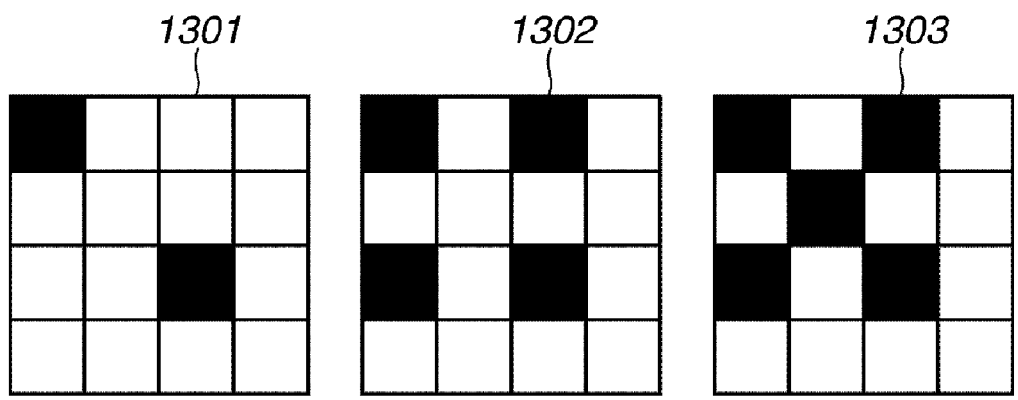
FIG. 12 is a diagram that illustrates one example of a dot-dispersed type dither matrix according to an embodiment of the present invention.
FIG. 13 is a diagram that illustrates dot patterns produced by using the dot-dispersed dither matrix in FIG. 12.

As will be described below and shown in FIG. 11, black pixels in a threshold value pattern 1101 indicate the large dots in the latent image area (in some cases, depending on a result of a density adjustment, the large dots are indicated as the black pixels in a threshold value pattern 1102 and a threshold value pattern 1103). On the other hand, as shown in FIG. 13, the black pixels in a threshold value pattern 1301 indicate the small dots (in some cases, depending on a result of a density adjustment, the small dots are indicated as the black pixels in a threshold value pattern 1302 and a threshold value pattern 1303). When only the large dots as indicated in the threshold value pattern 1101 shown in FIG. 11 are disposed all over the latent image area, the background mixture rate is 0%. When the large dots as indicated in threshold value pattern 1101 shown in FIG. 11 are disposed in 75% of the latent image area and the small dots as indicated in threshold value pattern 1301 as shown in FIG. 13 are disposed in 25% of the latent image area, the background mixture rate is 25%.

There is a term "density" that has a close meaning to the term "rate". The term "rate" and the term "density" are sometimes used to express the same meaning, however, in the present specification, the two terms are used to express different meanings. In this regard, the term "rate" has the meaning described above. On the other hand, the term "density" means a number of large dots disposed per each pixel. For example, let us consider a case where the background mixture rate is 0%. In this case, the rate of the large dots disposed in the latent image area is 100% and the density of the large dots disposed in the latent image area is 6.25%. This is because in threshold value pattern 1101 as shown in FIG. 11, one large dot exists per each sixteen pixels, and 1 divided by 16 gives 6.25%.

On the other hand, let us consider a case where the background mixture rate is 25%. In this case, the rate of the large dots disposed in the latent image area is 75% and the density of the large dots disposed in the latent image area is 4.6875%. This is because in threshold value pattern 1101 as shown in FIG. 11, one large dot exists per each sixteen pixels and 75% divided by 16 gives 4.6875%.

As described above, the background mixture rate (x%) directly represents the rate (x%) of small dots disposed in the latent image area. However, the background mixture rate substantially represents also the rate of the large dots disposed in the latent image area { (100−x)% }. In addition, the background mixture rate represents also the density { (100−x)× (1/y)% } of the large dots disposed in the latent image area. The formula is applicable in the case where it is determined that one pixel of large dots is disposed in y (for example, 16) pixels in the region where the large dots are disposed.

The combo box 502 can be indicated in a percent such as "0%", "25%", and "50%", or can be indicated also as "none", "small", and "large". Further, more detailed setting can be performed using a spin box instead of the combo box. In addition, the user can designate the background mixture rate of the dots disposed in the latent image area by using a slide bar 503 instead of the combo box 502 or the spin box. A setting value for the slide bar 503 and a setting value for the combo box 502 are in synchronization with each other. Accordingly, when the value of 25% is designated using the combo box 502, the slide bar 503 automatically moves to indicate a relatively small value. The slide bar 503 according to this embodiment is configured such that the background mixture rate cannot be raised to a value larger than 75%. If a rate of small dots in the latent image area is raised to a value larger than 75%, a difference with the background area (small dot rate: 100%) becomes small, and as a result, a visibility of the latent image after copying becomes too low. An upper limit value of the background mixture rate is computed and set on the basis of a result of a test such as a panel test. Accordingly, the upper limit value of the background mixture rate according to the present invention is not limited to 75%.

In addition, the upper limit value of the background mixture rate can be a value that appropriately varies in correspondence to the font of the character string used as the latent image. When an "OK" button 504 is pressed, the designation of the background mixture rate is completed and the processing returns to the screen as shown in FIG. 4. By using the screen as shown in FIG. 5A, the user can flexibly change a mixture rate of the dots disposed in the latent image area. Accordingly, the user can adjust invisibility of the latent image area in the original and visibility of the latent image in the copy at the same time.

The "detailed latent image area setting" according to this embodiment can be set using another screen instead of the screen as shown in FIG. 5A. For example, the screens as shown in FIG. 5B and FIG. 5C can be used.

Figure 5B:
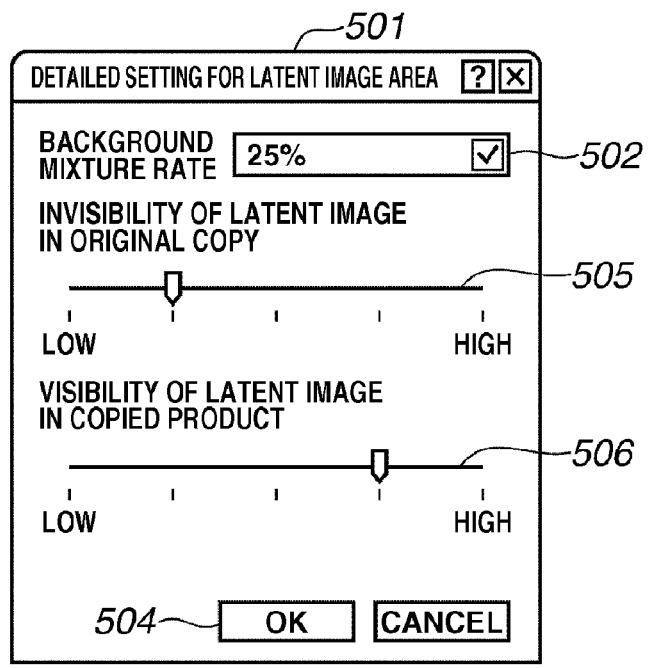
FIG. 5B is a diagram that illustrates a screen for detailed latent image area setting according to a second embodiment of the present invention.
Figure 5C:
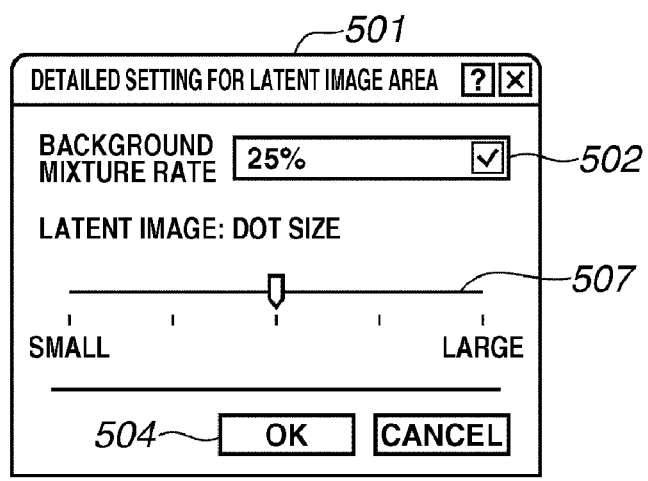
FIG. 5C is a diagram that illustrates a screen for detailed latent image area setting according to a third embodiment of the present invention.

FIG. 5B is a diagram that illustrates another example (i.e., the examples other than that shown in FIG. 5A) of the dialog in utilizing the function of the "detailed latent image area setting". FIG. 5B shows a detailed latent image setting screen according to a second embodiment of the present invention.

Portions of the latent image area setting dialog screen 501 illustrated in FIG. 5B such as the combo box 502, and the "OK" button 504 are the same as those shown in FIG. 5A, and accordingly, a description thereof is omitted here.

A slide bar 505 designates the "invisibility of the latent image in the original". A slide bar 506 designates the "visibility of the latent image in the copy". As will be described below, the higher the small dot rate in the latent image area is, the more the invisibility of the latent image in the original improves. On the other hand, the visibility of the latent image in the copy is reduced. Accordingly, the combo box 502, the setting value of the latent image invisibility slide bar 505, and the setting value of the latent image visibility slide bar 506 shift in synchronization to each other. For example, when the value of the combo box 502 is changed to a larger value (i.e., when the rate of the small dots disposed in the latent image area is raised), the value of the latent image invisibility slide bar 505 becomes higher and the value of the latent image visibility slide bar becomes lower. When the background mixture rate is 25% as shown in FIG. 5B, the rate of the small dots disposed in the latent image area is as low as 25%, and the size of average dots that constitute the latent image area differs from the size of average dots that constitute the background area. Accordingly, the latent image invisibility slide bar 505 indicates a relatively low value.

On the other hand, the latent image visibility slide bar indicates a relatively high value. By using the screen as shown in FIG. 5B, just as in the case of the screen as shown in FIG. 5A, the user can flexibly change the mixture rate of the dots disposed in the latent image area. Further, the user can change the dot mixture rate while confirming the invisibility of the latent image area in the original and the visibility of the latent image area in the copy at the same time. In the embodiment illustrated in FIG. 5B, the information representing the "invisibility of the latent image in the original" and the "visibility of the latent image in the copy" is displayed on the display screen, however, the present invention is not limited to such display. For example, a "visibility of the latent image in the original" can be displayed instead of the "invisibility of the latent image in the original". In addition, an "invisibility of the latent image in the copy" can be displayed instead of the "visibility of the latent image in the copy".

FIG. 5A and FIG. 5B as described above respectively show the dialog box for changing the designation of the background mixture rate. The above dialog box is used to designate the visibility of the latent image in the original and the invisibility of the latent image in the copy according to the change in the designation of the background mixture rate. On the other hand, in FIG. 5C, a size designation slide bar 507 is newly added which changes the size itself of the large dots disposed in the latent image, in addition to the background mixture rate. FIG. 5C shows a detailed latent image area setting screen according to a third embodiment of the present invention.

When the user changes the value of the size designation slide bar 507, a dither matrix for producing the large dots disposed in the latent image area is changed. For example, when the value of the size designation slide bar 507 is set to be small, a dither matrix is used which produces a pattern whose dot concentricity is relatively low, in order to produce the large dots. On the other hand, when the value of the size designation slide bar 507 is set to be large, a dither matrix is used which produces a pattern whose dot concentricity is relatively high, in order to produce the large dots. The dither matrixes and a density signal value applied to the dither matrix are previously stored in the external storage device 118. By using the screen as shown in FIG. 5C, just as in the case of the screen shown in FIG. 5A and FIG. 5B, the user can flexibly change the mixture rate of the dots disposed in the latent image area. Further, the user can flexibly change the size of the large dots disposed in the latent image area. Accordingly, the user can perform optimum setting for the latent image area while confirming the invisibility of the latent image area in the original and the visibility of the latent image area in the copy at the same time.

Figure 21:
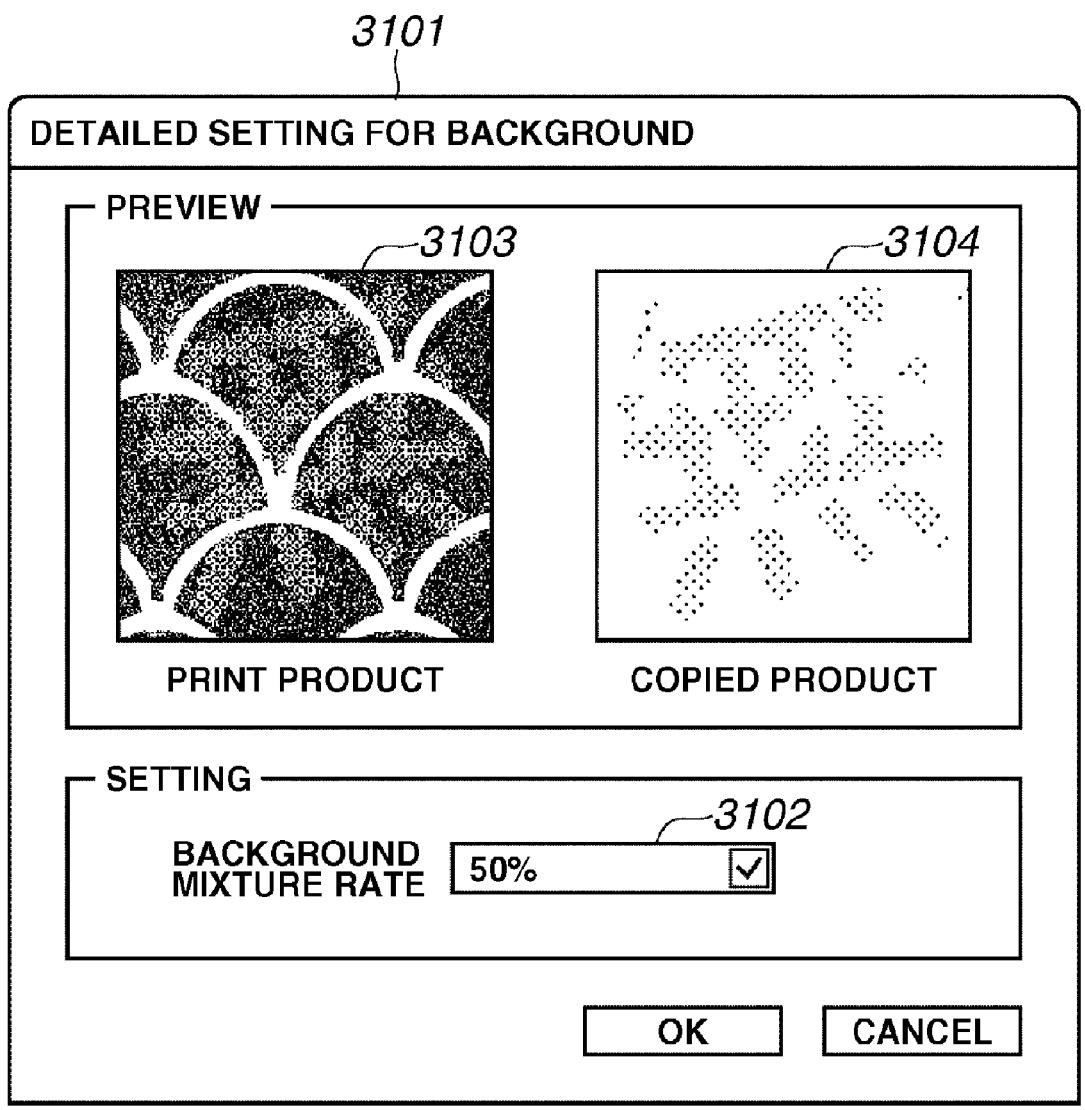
FIG. 21 is a diagram that illustrates a screen for detailed latent image area setting according to a fourth embodiment of the present invention.

FIG. 21 is a diagram that illustrates another example (i.e., an example other than that shown in FIG. 5A, FIG. 5B, and FIG. 5C) of the dialog which utilizes the "detailed latent image area setting". FIG. 21 shows a detailed latent image area setting screen according to a fourth embodiment of the present invention.

Referring to FIG. 21, an initial dialog 3101 is displayed when the detailed background setting button 415 as shown in FIG. 4 is pressed. A combo box 3102 (e.g., pulldown menu) designates the background mixture rate (the rate of small dots included in the latent image area). Preview images 3103 and 3104 respectively display one part of a print product (original) produced on the basis of the background mixture rate that is designated using the combo box 3102, and one part of the copy thereof. The preview images are produced on the basis of the background mixture rate (initial value: 50%) that the user designates.

Figure 22:
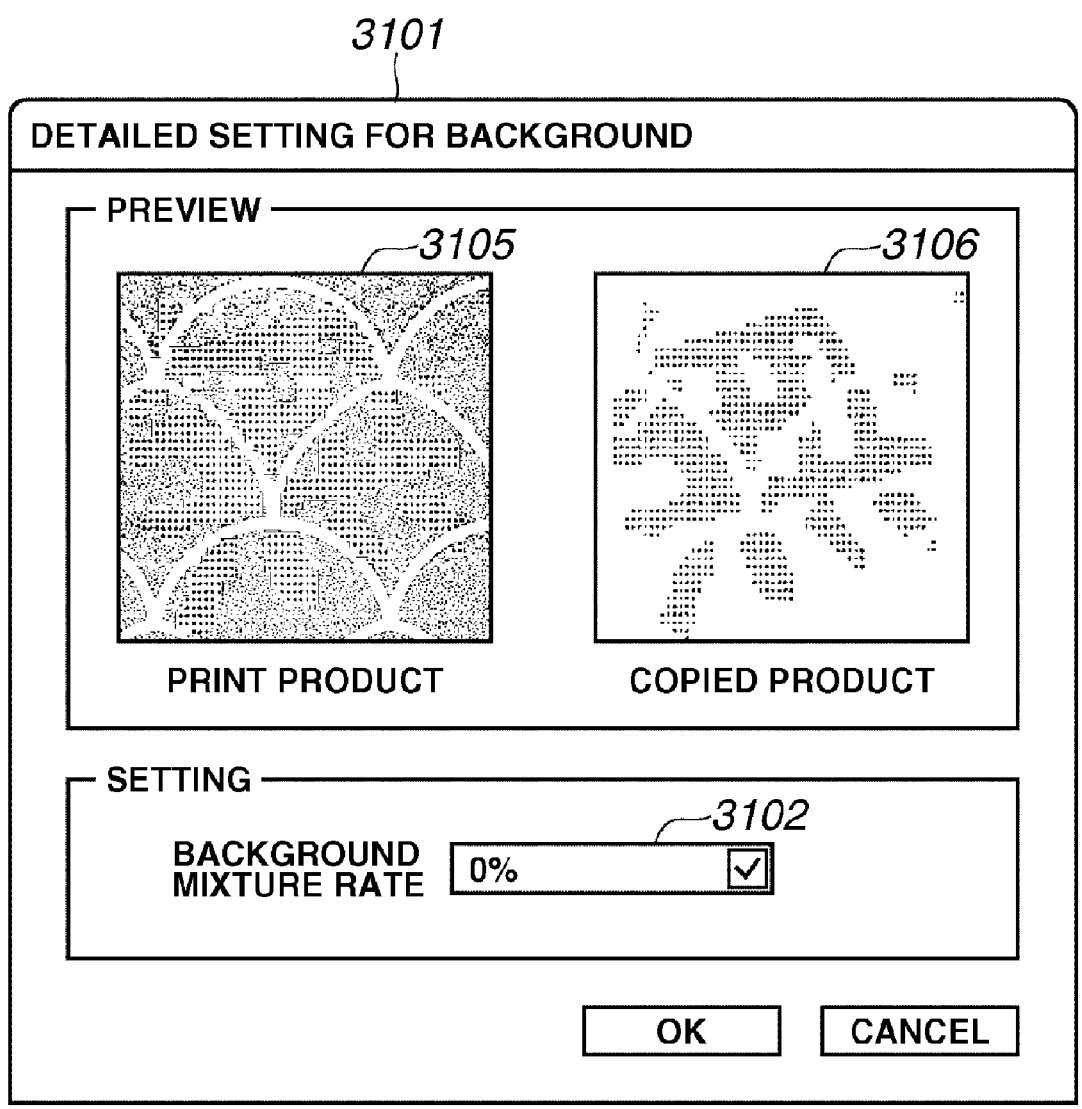
FIG. 22 is a diagram that illustrates a screen for detailed latent image setting that is displayed when a designation of a background mixture rate is changed through the screen 4 for detailed latent image setting.

FIG. 22 shows a dialog that is displayed when the user operates the combo box 3102 (the rate of small dots included in the latent image area) so as to reduce the background mixture rate to 0%. The preview images are produced on the basis of the background mixture rate (initial value: 0%) that the user changes.

A preview image 3105 as shown in the display screen corresponds to a preview image 3103 (one part of the print product) and a preview image 3106 corresponds to a preview image 3104 (one part of a copy).

As described above, the user interface is configured such that the user can readily (intuitively) recognize the change in the invisibility of the latent image in the print product and the visibility of the latent image in the copy caused by change of the background mixture rate.

In the above description, the control is performed so that, when a new background mixture rate is designated by the user, the CPU 111 changes the background mixture rate in accordance with the designation and produces the preview image on the basis of the changed background mixture rate. In the above description, the CPU 111 performs the control so that the produced preview image is displayed on the display screen. However, the present invention is not limited to this configuration.

For example, the preview images 3103, 3104, 3105, and 3106 can be previously stored in the ROM 113 as a resource for the initial dialog 3101. Further, a correspondence or a relationship between the alternatives in the combo box 3102 (namely, the values for the background mixture rate) and each preview image (one part of the print product and one part of the copy) can be previously stored in the ROM 113 as the resource for the initial dialog 3101. When the user designates "0%" in this case, the CPU 111 changes the background mixture rate in accordance with the designation and reads the preview images 3105 and 3106 from the ROM 113 on the basis of the changed background mixture rate. The CPU 111 performs the control so that the read preview image is displayed on the display screen.

<Outline of the Copy-Forgery-Inhibited Pattern Image Production Processing>

Figure 6:
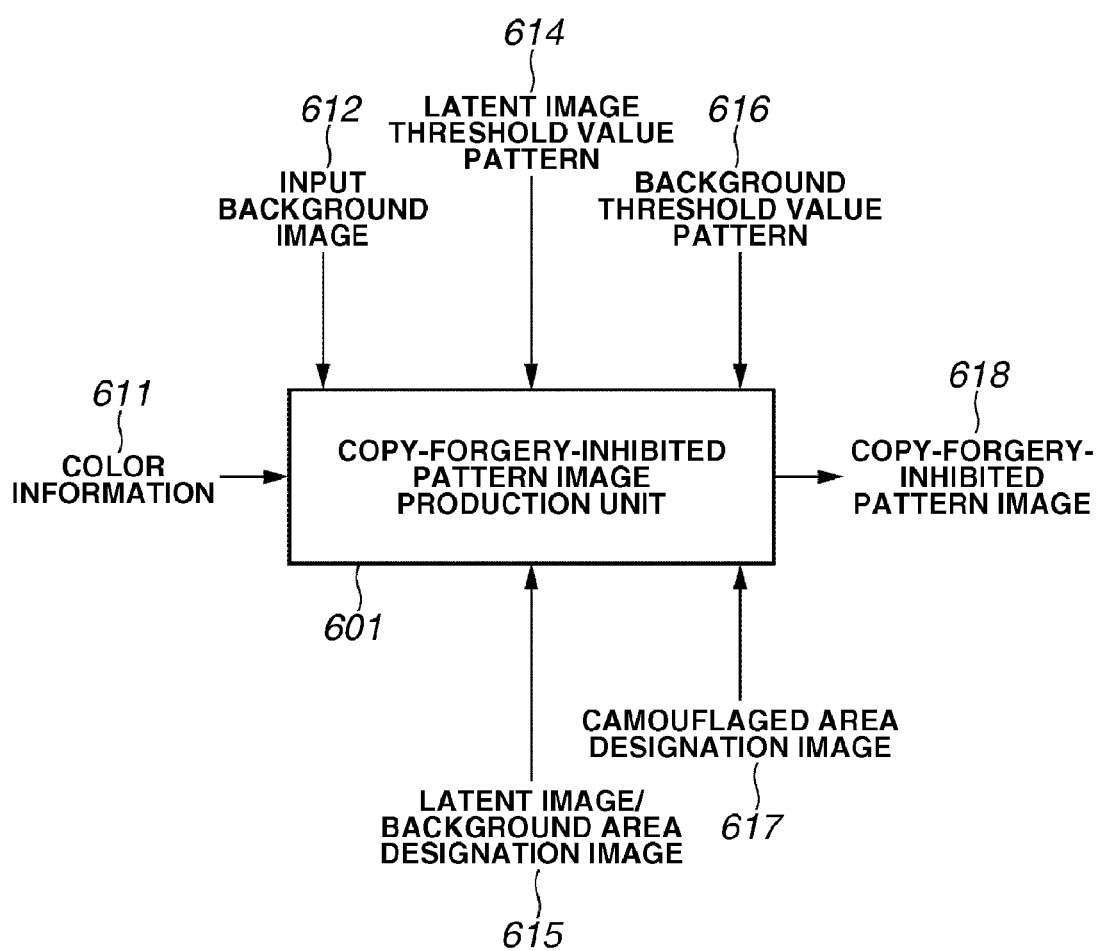
FIG. 6 is a diagram that illustrates a copy-forgery-inhibited pattern image production unit according to an embodiment of the present invention.

FIG. 6 is a diagram that illustrates a copy-forgery-inhibited pattern image production unit 601 according to an embodiment of the present invention.

Color information 611, an input background image 612, a latent image threshold value pattern 614, a latent image background region designation image 615, a background threshold pattern 616, and a camouflage region designation image 617 are inputted to the copy-forgery-inhibited pattern image production unit 601. When these data are inputted, the copy-forgery-inhibited pattern image production unit 601 produces and outputs a copy-forgery-inhibited pattern image 618.

The input background image 612 is the image having a given region size (in which dots of all pixels are off). For example, the given region size can have a size of a whole A4-size image.

The latent image background region designation image 615 is the image for designating the latent image area and the background area, and has a one-pixel one-bit configuration. In the latent image background region designation image 615, when a bit value of a certain pixel is 1, for example, this indicates that the pixel is included in the latent image area. When the bit value of a certain pixel is 0, for example, the pixel is included in the background area.

The camouflage region designation image 617 is the image for designating a camouflage region and has the one-pixel one-bit configuration. In the camouflage region designation image 617, when the bit value of a certain pixel is 1, for example, this indicates that the pixel is not included in the camouflage region. When the bit value of a certain pixel is 0, for example, this indicates that the pixel is included in the camouflage region.

Figure 7:
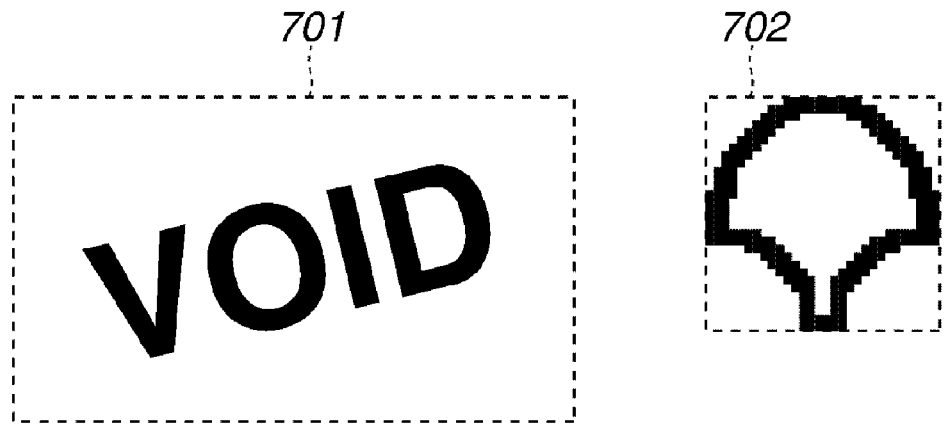
FIG. 7 is a diagram that illustrates an example of a masked image.

FIG. 7 is a diagram that illustrates one example of the latent image background region designation image 615 and the camouflage region designation image 617. Referring to FIG. 7, the image 701 is one example of the latent image background region designation image 615. The image 702 is one example of the camouflage region designation image 617.

As is described above, with respect to the copy-forgery-inhibited pattern image, it may be desirable that the reflection densities of the latent image area and the background area of an output product have substantially the same value. Accordingly, a preferred image signal (e.g., an optimum image signal) is inputted to each of a background dither matrix and a latent image dither matrix so as to produce the background threshold pattern 616 and the latent image threshold value pattern 614. A technique for determining a preferred image signal (e.g., an optimum image signal) to be inputted to the background dither matrix and the latent image dither matrix, is discussed in Japanese Patent Application Laid-Open No. 2005-94327.

Figure 8:
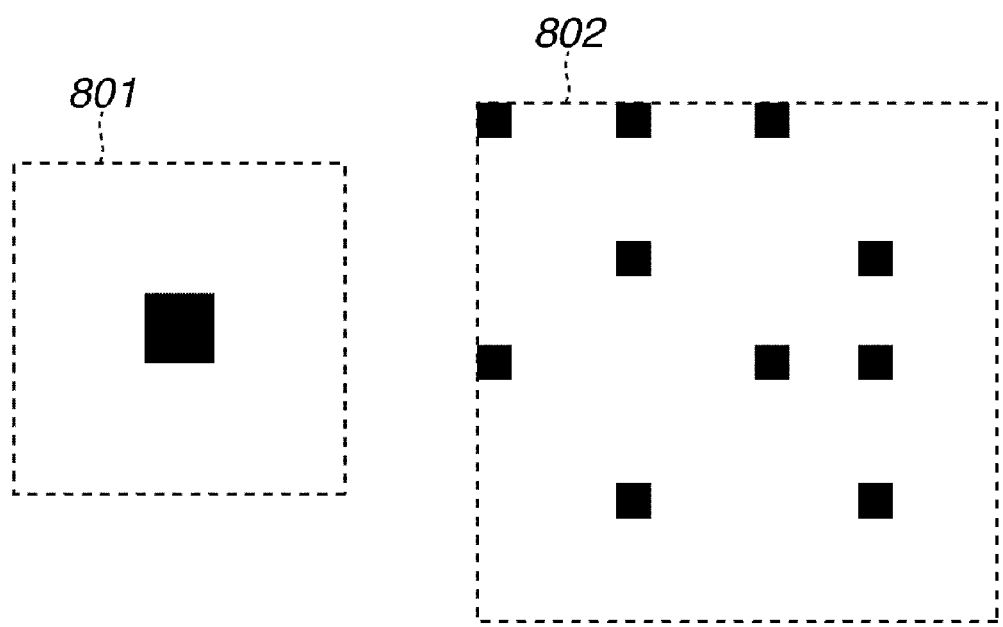
FIG. 8 is a diagram that illustrates an example of a latent image threshold value pattern and a background threshold value pattern in which dots are on and off, according to an embodiment of the present invention.

FIG. 8 is a diagram that illustrates one example of the latent image threshold value pattern 614 and the background threshold pattern 616. The example as shown in FIG. 8 includes a latent image threshold value pattern 801 and a background threshold value pattern 802.

<A Detail 1 of Copy-Forgery-Inhibited Pattern: Processing Performed When the Background Mixture Rate Is 0%>

Figure 9:
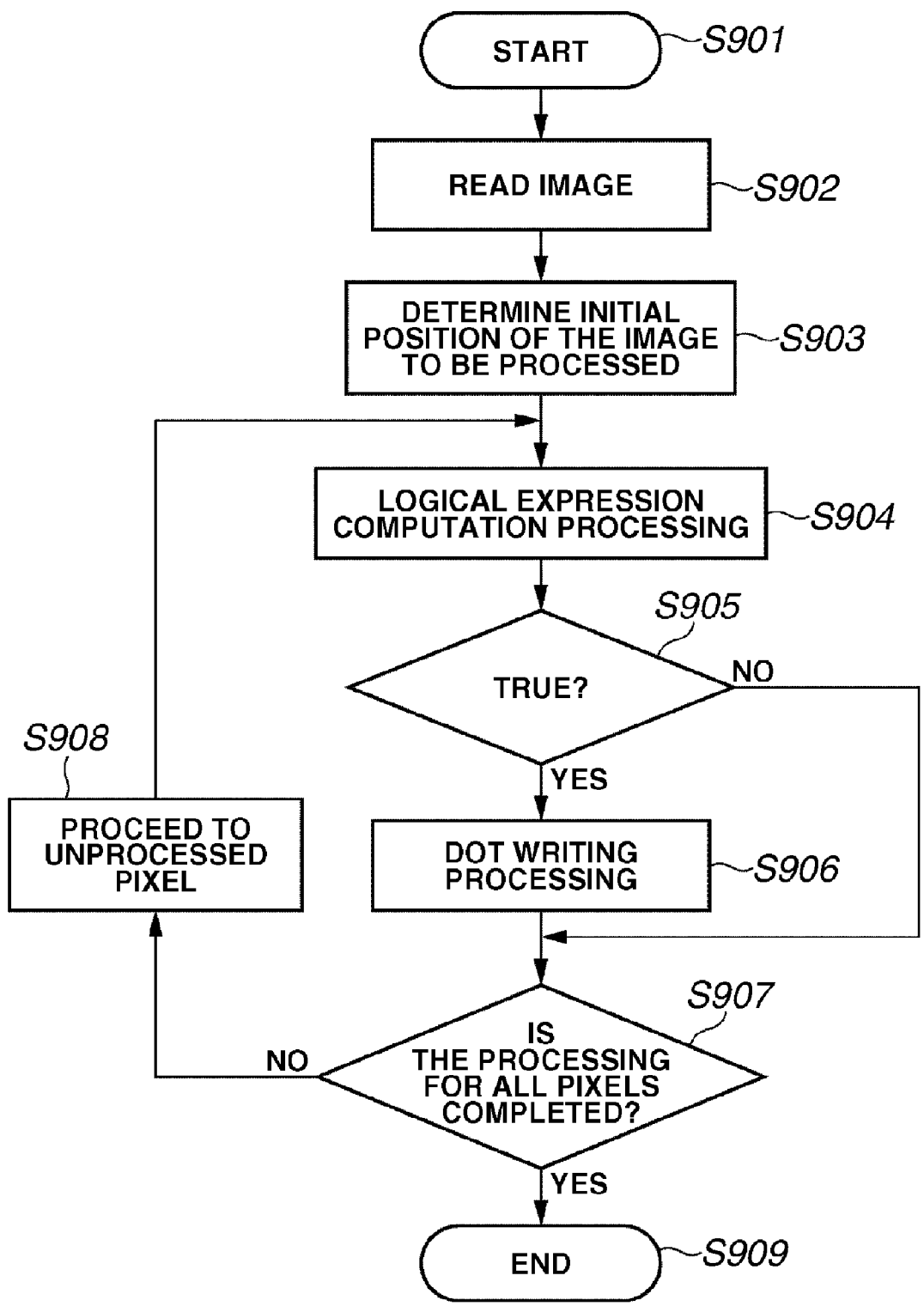
FIG. 9 is a flow chart of a processing for producing a copy-forgery-inhibited pattern image according to an embodiment of the present invention.

Next, a procedure of an internal processing in the copy-forgery-inhibited pattern image production unit 601 is described with reference to FIG. 9.

In step S901, the copy-forgery-inhibited pattern image production processing starts.

In step S902, the color information 611, the input background image 612, the latent image threshold value pattern 614, the latent image background region designation image 615, the background threshold pattern 616, and the camouflage region designation image 617 are read.

Then, in step S903, an initial pixel (e.g., initial position) of the copy-forgery-inhibited pattern image to be processed is determined. For example, when the image processing is performed in an order of raster scanning from an upper-left corner to a lower-right corner for a whole part of an input image, an initial position of the copy-forgery-inhibited pattern image is upper-left.

Next, in step S904, the latent image threshold value pattern 614, the latent image background region designation image 615, the background threshold pattern 616, and the camouflage region designation image 617 are arranged in a tile shape from the upper-left portion of the input background image 612. That is, with respect to the pixel of the input background image 612 that is to be processed, a computation is performed using an expression (1) below so as to determine whether a pixel value corresponding to the dot at the time of printing should be written (i.e., it is determined whether the dot should be on or off). The pixel value in this case corresponds to the inputted color information 611.

$$nWriteDotOn = nCamouflage \times \\ (nSmallDotOn \times \overline{nHiddenMark} + nLargeDotOn \times nHiddenMark) \quad (1)$$

Definitions of components of the expression (1) are as described below.

nCamouflage: set to 0 for the pixel included in the camouflage region in the camouflage region designation image 617 and set to 1 for the pixel not included in the camouflage region in the camouflage region designation image 617 nSmallDotOn: set to 1 if the pixel is black (ON) in the background threshold pattern 616 and set to 0 if the pixel is white (OFF) in the background threshold pattern 616 nLargeDoton: set to 1 if the pixel is black (ON) in the latent image threshold value pattern 614 and set to 0 if the pixel is white (OFF) in the latent image threshold value pattern 614 nHiddenMark: set to 1 if the pixel is equivalent to the latent image area in the latent image background region designation image 615 and set to 0 if the pixel is equivalent to the background area in the latent image background region designation image 615

/nHiddenMark: negation of nHiddenMark; set to 0 if the pixel is equivalent to the latent image area and set to 1 if the pixel is equivalent to the background area In this regard, vertical and horizontal lengths of each of the latent image threshold value pattern 614, the latent image background region designation image 615, the background threshold pattern 616, and the camouflage region designation image 617 are previously determined. Accordingly, the image having a value equivalent to a least common multiple of the length is used as a minimum unit for repetition. In the copy-forgery-inhibited pattern image production unit 601, only one part of the copy-forgery-inhibited pattern image is produced that is the minimum unit of the repetition (i.e., the image of the size equivalent to the least common multiple). The produced parts of the copy-forgery-inhibited pattern image are repeatedly arranged in the tile shape so as to fit the size of the input background image 612.

Next, in step S905, a result of the computation by step S904 (i.e., the value of nWriteDotOn) is determined. If nWriteDotOn equals 1, the processing advances to step S906. If nWriteDotOn equals 0, the processing advances to step S907.

In step S906, the processing for writing the pixel value to each pixel is performed. The value of the pixel value depends on the color information 611.

In step S907, it is determined whether all the pixels of the input background image 612 are processed. If it is determined that all the pixels of 612 are not yet processed, the processing advances to step S908. Then, unprocessed pixels are selected, and the processing in steps S904 through S906 are performed again. On the other hand, if the processing for all the pixels of 612 is completed, the processing advances to step S909 and the image processing by the copy-forgery-inhibited pattern image production unit 601 ends. In the above processing, the copy-forgery-inhibited pattern image 618 of the same size as the input background image 612 is produced.

Next, the description is made as to the latent image threshold value pattern 614 and the background threshold pattern 616. In this embodiment, the latent image area is produced on the basis of a dot-concentrated-type dither matrix (for example, spiral type dither matrix), and the background area is produced on the basis of a dot-dispersed-type dither matrix (for example, Bayer-type dither matrix).

FIG. 10 is a diagram that illustrates one example of a 4×4 spiral type dither matrix. The threshold values of the 4×4 spiral type dither matrix are arranged so that the values increase as the values advance from a center portion toward an outer side portion in a spiral manner.

FIG. 11 is a diagram that illustrates a threshold value pattern (dot arrangement) obtained by processing a given input image signal with a threshold value using the 4×4 spiral type dither matrix as shown in FIG. 10. Referring to FIG. 11, the charts 1101, 1102, 1103 respectively describe the threshold pattern obtained by threshold-processing of the input image signals "3", "6", and "9" using the dither matrix as shown in FIG. 10. The threshold pattern (dot arrangement) obtained here is the pattern in which each of the dots is disposed in a concentrated manner.

FIG. 12 is a diagram that describes an example of a 4×4 Bayer-type dither matrix. The threshold pattern is produced by a dither processing performed to arbitrary input image signal using the Bayer-type dither matrix. The threshold pattern is designed so that each of the dots is disposed in a dispersed manner.

$$D_N = \begin{bmatrix} 4D_{N/2} & 4D_{N/2} + 2U_{N/2} \\ 4D_{N/2} + 3U_{N/2} & 4D_{N/2} + U_{N/2} \end{bmatrix}$$

Where N is an exponent of 2 and UN is an N×N matrix whose respective component is 1.

FIG. 13 is a diagram that illustrates the threshold pattern (dot arrangement) that is obtained by threshold-processing of a given input image signal using the 4×4 Bayer-type dither matrix as shown in FIG. 12. Referring to FIG. 13, the charts 1301, 1302, 1303 respectively describe the threshold pattern obtained by threshold-processing of the input image signals "2", "4", and "5" using the dither matrix as shown in FIG. 12. The threshold pattern (dot arrangement) obtained here is the pattern in which each of the dots is disposed in a dispersed manner. In the Bayer-type dither matrix, each component of the threshold value matrix is arranged in an order with a minimum of contacts with each other, and the threshold pattern has an independent grid-like dot arrangement. In the Bayer-type dither, in some cases, when the size of the dither matrix is large, a periodic texture by the matrix appears, however, as a meritorious effect, a periodic beautiful pattern can be obtained in a specific tone.

In this embodiment, the description is made below focused on a case where the Bayer-type dither matrix is used as the dither matrix for the background. However, the present invention is not limited to the configuration using the Bayer-type dither matrix, but other dot-dispersed dither matrix (for example, a blue noise mask) and an error diffusion method can also be utilized.

Figure 14:
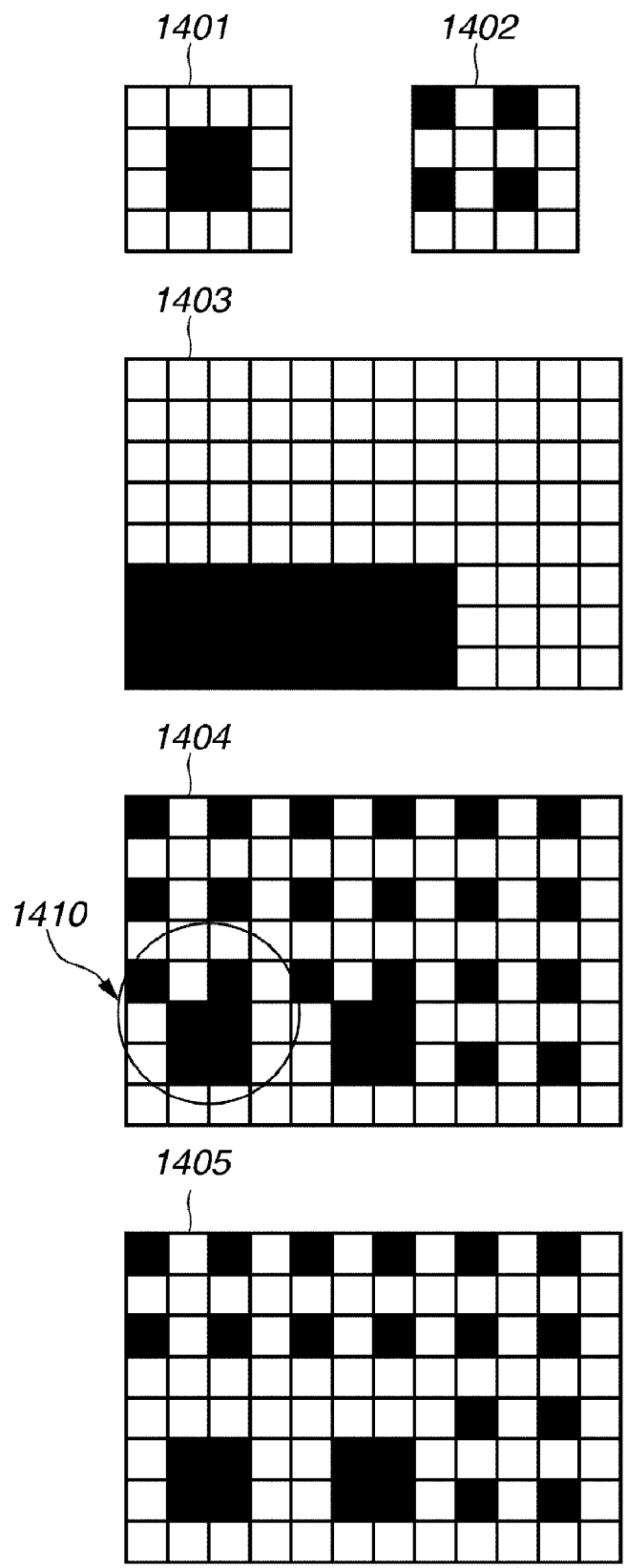
FIG. 14 is a diagram that illustrates a boundary processing according to an embodiment of the present invention.

FIG. 14 is a diagram that illustrates a method of producing the copy-forgery-inhibited pattern image by the copy-forgery-inhibited pattern image production unit 601 as shown in FIG. 6. Referring to FIG. 14, patterns 1401, 1402, 1403 describes a latent image threshold value pattern, a background threshold value pattern, and a latent image background region designation image, and a pattern 1404 describes the copy-forgery-inhibited pattern image produced based on the expression (1) above. When the copy-forgery-inhibited pattern image 1404 is produced, a camouflage pattern is not introduced.

In the copy-forgery-inhibited pattern image 1404 in FIG. 14, as shown in a region 1410 marked with a circle, a cluster of dots is produced where the latent image threshold pattern and the background threshold pattern are combined. The combination occurs where the latent image of the latent image background region designation image 1403 changes to the background of the latent image background region designation image 1403. Since the cluster of dots appears at a boundary of the latent image area and the background area in a concentrated manner, an outline shape of the latent image area becomes conspicuous.

The processing for preventing the cluster of dots is a "boundary processing".

In FIG. 14, an image 1405 is a copy-forgery-inhibited pattern image that is subjected to the boundary processing. In the copy-forgery-inhibited pattern image 1405, it can be recognized that the cluster of dots is not produced where the latent image threshold pattern and the background threshold pattern are combined where the latent image and the background designated by the latent image background region designation image are switched. The boundary processing is described below in detail.

The boundary processing refers to a processing in which the boundary of the latent image area and the background area of the latent image background region designation image that is inputted, is synchronized to be the size of the latent image threshold value pattern. In this method, first, the latent image threshold value pattern is repeatedly arranged within the latent image background region designation image. Then, it is determined whether a given pixel of each latent image threshold pattern (i.e., a previously determined pixel such as a central pixel and a pixel at an upper-right portion) belongs to the latent image area or the background area in the latent image background region designation image. If the given pixel is determined to belong to the latent image area, the latent image background region designation image is modified so that all the pixels in the latent image threshold value pattern that includes the given pixel, is the latent image area. In this embodiment, as described above, the latent image background region designation image is modified so as to produce the copy-forgery-inhibited pattern image that has no dot cluster or reduced number of dot clusters.

Figure 15:
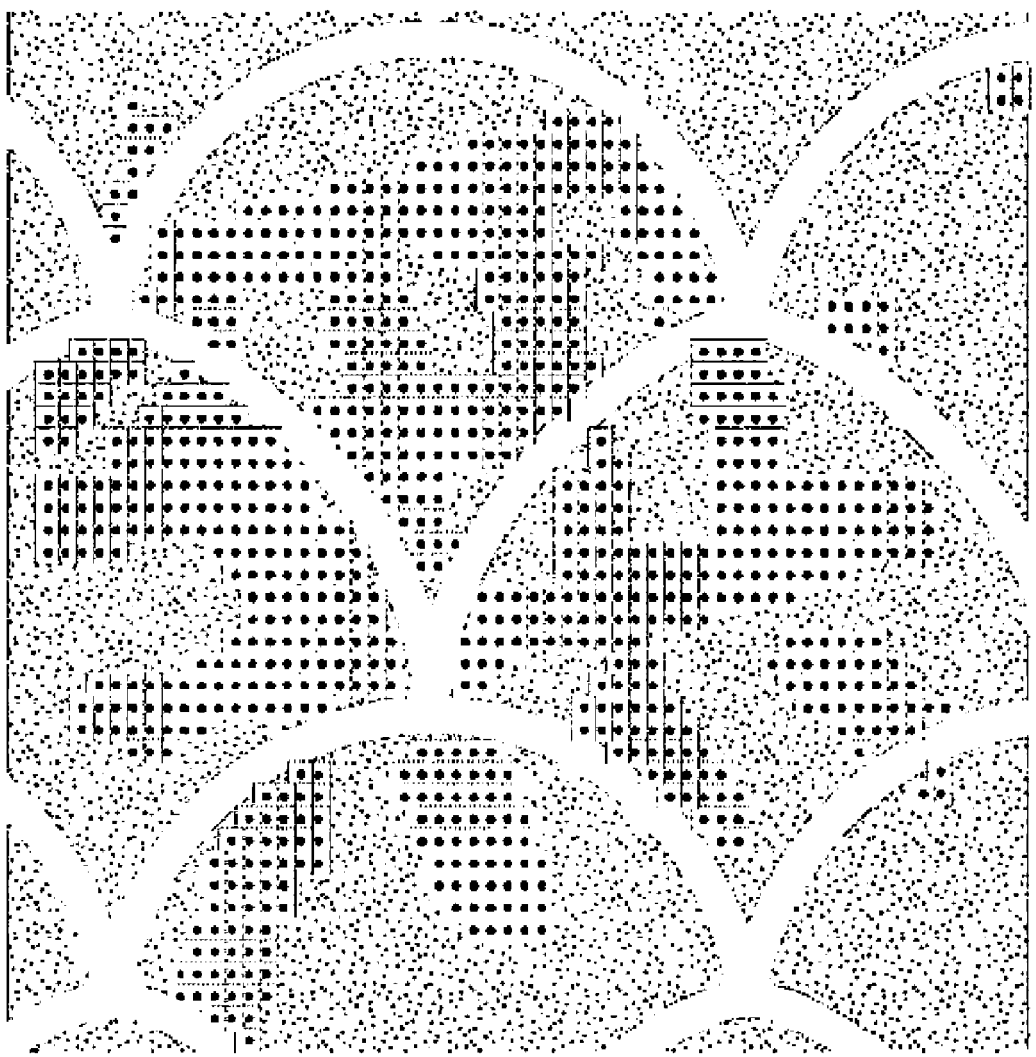
FIG. 15 is a diagram that illustrates one example of a copy-forgery-inhibited pattern image produced by a copy-forgery-inhibited pattern image production unit according to an embodiment of the present invention.

FIG. 15 is a diagram that illustrates a part of a copy-forgery-inhibited pattern image produced by the copy-forgery-inhibited pattern image production unit 601. In the copy-forgery-inhibited pattern image as shown in FIG. 15, a phenomenon of dot cluster does not occur at the boundary between the latent image area and the background area. Accordingly, the boundary between the latent image area and the background area can hardly be recognized.

The disposition of the latent image threshold value pattern 614 in the latent image area region and the background threshold pattern 616 in the background area region as described above, is referred to below as a "0% disposition". The 0% disposition is disposition when the background mixture rate is set to 0% using the UIs as shown in FIG. 5A, FIG. 5B, and FIG. 5C.

<A Detail 2 of Copy-Forgery-Inhibited Pattern: Processing Performed When the Background Mixture Rate is 50%>

Next, the description is made as to details of the copy-forgery-inhibited pattern production processing performed when the background mixture rate is designated to be 50%. In this case, a "50% disposition" is performed. In the 50% disposition, the latent image threshold value pattern 614 is disposed in a given region of the latent image area in a checkered manner, and the background threshold pattern 616 is disposed in the same checkered manner in the other region of the latent image area. Naturally, in the background area region, the background threshold pattern 616 is disposed.

Figure 18:
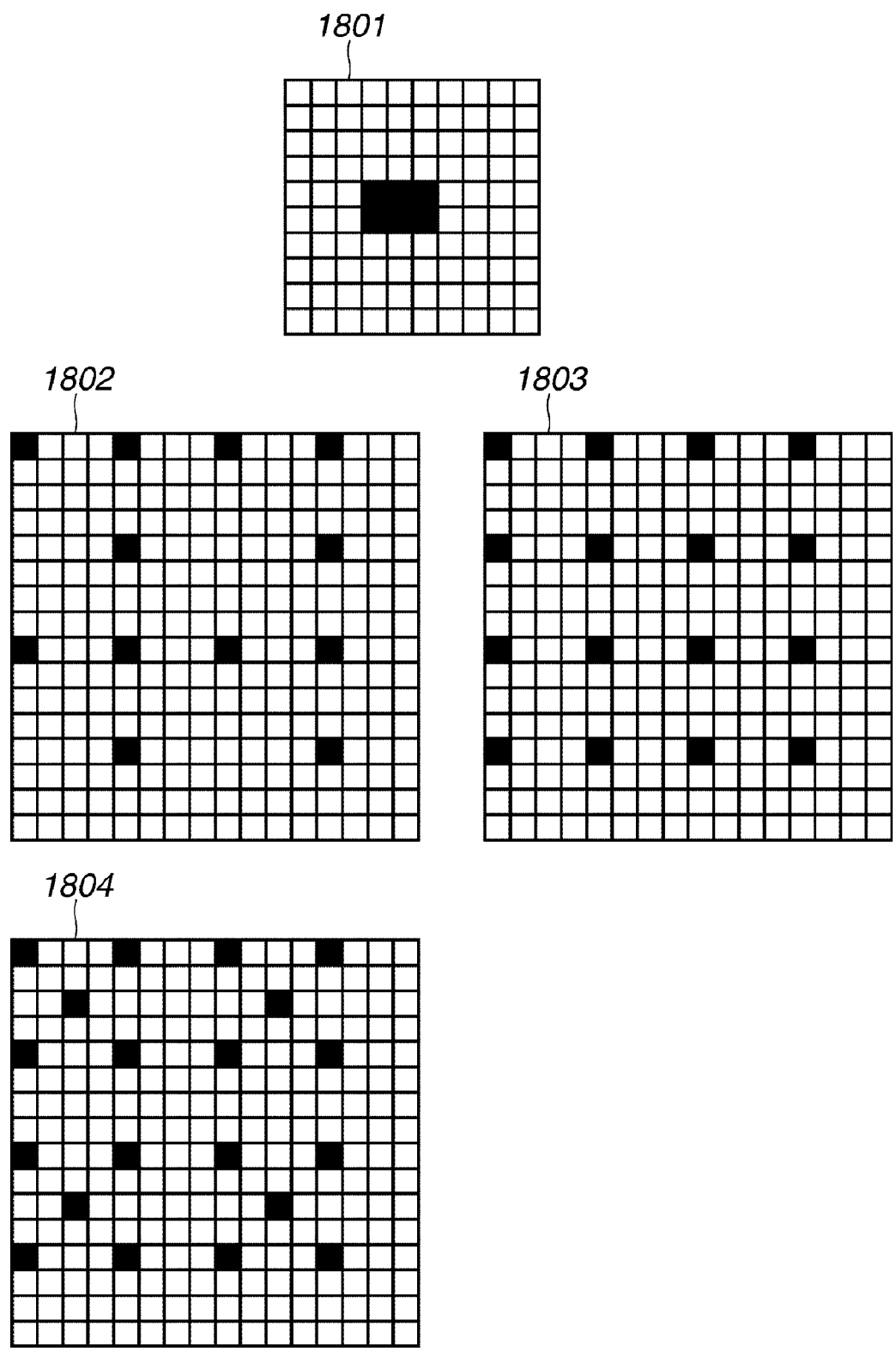
FIG. 18 is a diagram that illustrates a latent image threshold value pattern and background threshold patterns in which dots are on and off, according to an embodiment of the present invention.

The checkered pattern according to this embodiment is a pattern in which a plurality of patterns are repeatedly arranged in a staggered configuration. The checkered pattern includes, for example, a grid-like pattern. The latent image threshold value pattern 614 can be a pattern 801 as shown in FIG. 8, and the background threshold pattern 616 can be a pattern 802 as shown in FIG. 8, for example. However, in this embodiment, the latent image threshold value pattern 614 is a 10×10 pixels pattern like a pattern 1801 as shown in FIG. 18. Further, the background threshold pattern 616 is a 16×16 pixels pattern like patterns 1802, 1803, and 1804 as shown in FIG. 18, for example.

Here, a method of disposing the latent image threshold value pattern 614 when the "50% disposition" is performed (i.e., the method of modifying the latent image background region designation image) is described in more detail.

First, a flag nChecker is prepared for the purpose of dividing the latent image area into two regions (including the region to which the large dots are written and the region to which the large dots are not written). Here, the flag nChecker is set to a given value of 0 or 1 at an upper-left portion of the image or at a position at which an embedding of the copy-forgery-inhibited pattern image starts. Then, every time a dot-writing region shifts to the latent image threshold value pattern just at its right side or just below, the value of the flag nChecker is reversed in relation to a previous value.

That is, when the value of nChecker is set to 1 in the pixel that is "(1,1), (1, 2), . . . ,(1, 10) and (2, 1), (2, 2), . . . , (2, 10) and . . . and (10, 1), (10, 2), . . . , (10, 10)", the value of the flag nChecker is as described below. The value of the nChecker is 0 in the pixel that is "(11, 1), (11, 2), . . . , (11, 10) and (12, 1), (12, 2), . . . , (12, 10) and . . . and (20, 1), (20, 2), . . . , (20, 10)". The value of nChecker is 0 in the pixel that is "(1, 11), (1, 12), . . . , (1, 20) and (2, 11), (2, 12), . . . , (2, 20) and . . . and (10, 11), (10, 12), . . . , (10, 20)". The value of nChecker is 0 in the pixel that is "(11, 11), (11, 12), . . . , (11, 20) and (12, 11), (12, 12), . . . , (12, 20) and . . . and (20, 11), (20, 12), . . . , (20, 20)". As described above, when the value of the nChecker is 1 in the region where the latent image threshold value pattern is disposed next thereto, the value of the nChecker is 0 in the region where the latent image threshold value pattern is disposed. "(1, 1)" represents the upper mostleft pixel, "(2, 1)" represents the pixel which is shifted by 1 from the pixel in a direction of main scanning, and "(1, 2)" represents the pixel which is shifted by 1 from the pixel in a direction of sub scanning.

By changing the value of the flag nChecker, the latent image background region image can be produced whose values are switched between 0 and 1 in a unit of the size of the latent image threshold value pattern 614 (for example, 10×10 pixels) A logic operation as described by an expression below is performed using such latent image background region image.

$$nWriteDotOn = \\ nCamouflage \times \begin{Bmatrix} nSmallDotOn \times \overline{nHiddenMark} + \\ nLargeDotOn \times (nHiddenMark \times nChecker) + \\ nSmallDotOn \times (nHiddenMark \times \overline{nChecker}) \end{Bmatrix}$$

That is, the latent image threshold value pattern (the large dots) is written when the latent image background region designation image is the latent image area (nHiddenMark=1) and the flag nChecker defining the checkered pattern is 1. In addition, the writing of the background threshold value pattern (the small dots) is performed when the latent image background region designation image is the latent image area (nHiddenMark =0). The background threshold value pattern (the small dots) is written when the latent image background region designation image is the latent image area (nHidden-Mark=1) and the flag nChecker defining the checkered pattern is 0.

Figure 16:
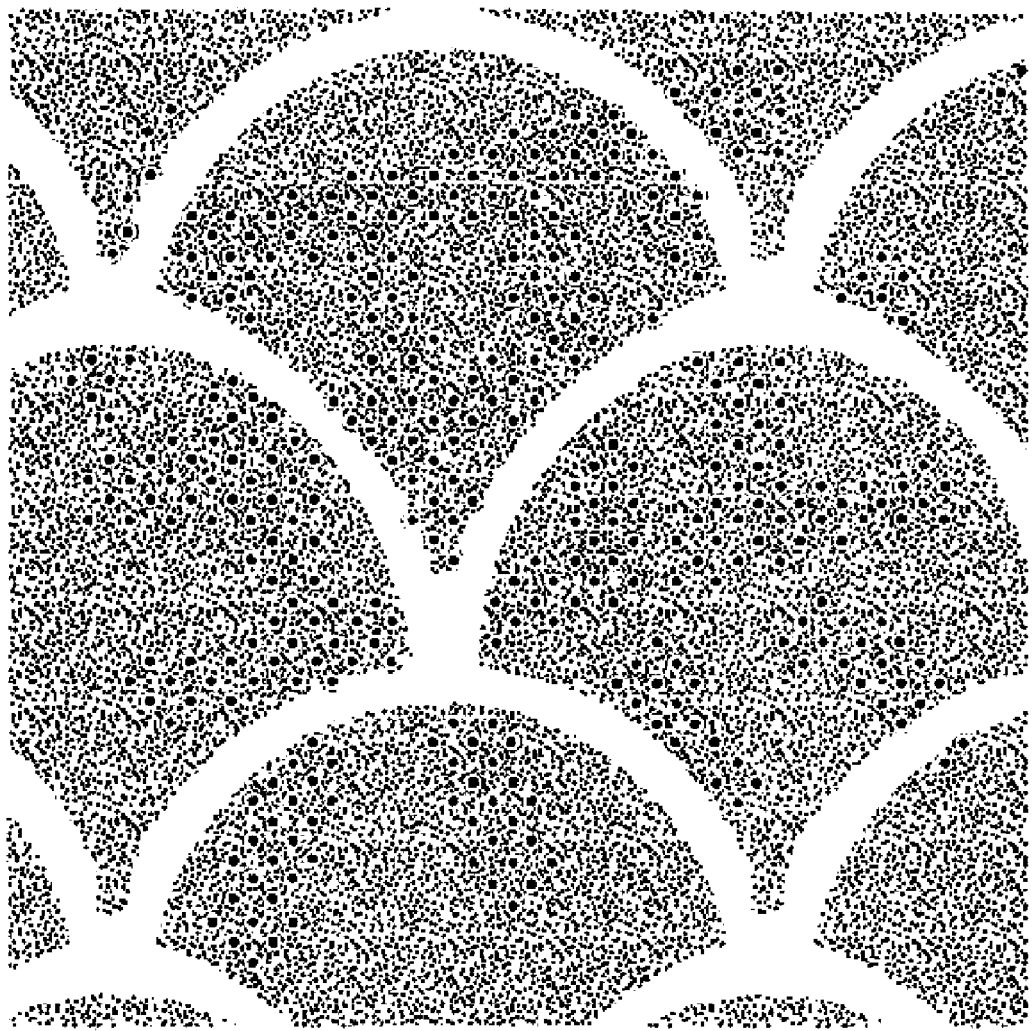
FIG. 16 is a diagram that illustrates one example of the copy-forgery-inhibited pattern image in which large dots and small dots are disposed in a mixed manner in a latent image area according to an embodiment of the present invention.
Figure 17:
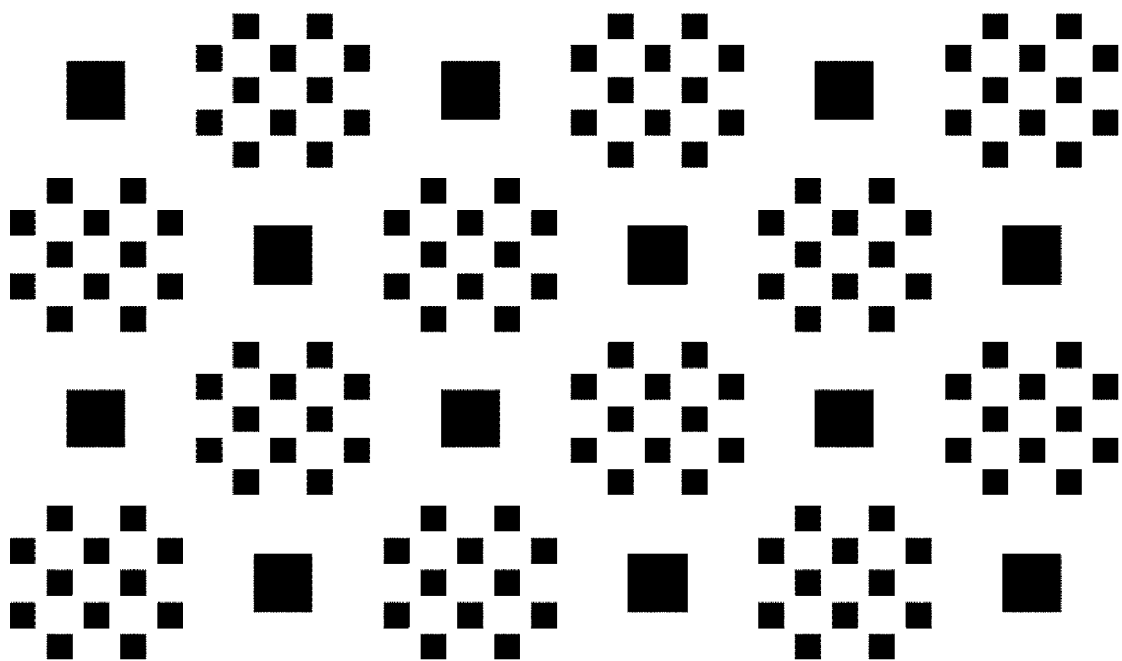
FIG. 17 is a diagram that illustrates an enlarged view of a part of the copy-forgery-inhibited pattern image shown in FIG. 16.

FIG. 16 is a diagram that illustrates one example of the copy-forgery-inhibited pattern image disposed in the "50% disposition" that is produced using the above expression. FIG. 17 is a diagram showing one part of the copy-forgery-inhibited pattern image shown in FIG. 16 under magnification.

Referring to FIG. 17, the latent image threshold value pattern is disposed at a screen angle of 45 degrees, and accordingly, a spatial frequency occurring due to a periodicity of the latent image threshold value pattern (the large dots) is not so conspicuous. In addition, since both large dots and small dots are disposed in the latent image area, the boundary between the latent image area and the background area is hardly visible. On the other hand, the latent image threshold value pattern that is disposed in the latent image area is approximately a half of the case of the "0% disposition", and accordingly, the reflection density of the latent image area is lower compared to the case of the "0% disposition". However, just as in the case of the above "0% disposition", the reflection density of the latent image area is reproduced much more densely than the reflection density of the background area. Accordingly, in the case of the "50% disposition", the latent image clearly appears on the copy.

Therefore, when the copy-forgery-inhibited pattern image is produced using the above "50% disposition", visibility of the latent image in the copy is a little reduced, however, the effect of making the latent image more invisible in the original is higher in the case of the "0% disposition".

In this embodiment, every time the dot writing region shifts to the next latent image threshold value pattern, the value of the flag nChecker is reversed with respect to the previous value so as to implement the "50% disposition". That is, the value of the nChecker is changed in such a manner as 0, 1, 0, 1, 0, 1, . . . , every time the latent image threshold value pattern shifts to the next pattern. However, the present invention is not limited to this. That is, the value of the nChecker should be shifted only to obtain a result that the rate of values 0 and 1 becomes 50% respectively. For example, by changing the value of the nChecker in such a manner as 0, 0, 1, 1, 0, 0, . . . , the "50% disposition" can also be implemented.

<A Detail 3 of Copy-Forgery-Inhibited Pattern: Processing Performed when the Background Mixture Rate is Neither 50% Nor 0%>

In the above description, if the rate 50% of the nChecker becomes 0 and 1 respectively, the "50% disposition" is implemented. However, the present invention is not limited to the "0% disposition" and the "50% disposition". That is, whatever background mixture rate is designated, the method of reversing the value of the nChecker can be adjusted and the copy-forgery-inhibited pattern image having the background mixture rate can be obtained. For example, in the case of a "25% disposition", the rate that the nChecker is 0, can be set to 25%. In addition, in the case of a "75% disposition", the rate where the nChecker is 0, can be set to 75%.

In the above description, the latent image area is divided into two regions, however, the present invention is not limited to this. The latent image area can be divided into three or more regions. For example, the object of the present invention can also be achieved as follows: The latent image area is divided into three regions, then each of the three regions is defined as a large dot region, small dot region, and a region in which no dots are produced (a plain region). Then, the regions can be arbitrarily disposed to produce the copy-forgery-inhibited pattern image. Further, the object of the present invention can be achieved as follows: Each of the three regions is defined as a large dot region, medium dot region, and a small dot region. Then, the regions can be arbitrarily disposed to produce the copy-forgery-inhibited pattern image.

<Combining Processing, Image Processing, and Image Forming>

Next, copy-forgery-inhibited pattern image data and original image data that are outputted to the printer 121, are subjected to following processing.

The printer 121 includes an intermediate language conversion unit that converts PDL data externally received, into intermediate language data, and an rasterization unit that combines two kinds of image data while rasterizing the intermediate language data. The printer 121 includes an image processing unit that image-processes the combined image data, and an image forming unit that performs image forming. Among these units, a technique related to the intermediate language conversion unit is widely-known, and therefore, a description thereof is omitted here. Hereinbelow, the combining processing by the expansion unit is described.

Here, the processing is described which combines the input original image (i.e., a ledger sheet and a certificate) and the copy-forgery-inhibited pattern image produced by the above copy-forgery-inhibited pattern image production unit 601.

In the rasterization unit, the original image and the produced copy-forgery-inhibited pattern image are combined so as to produce a combined image. When the original image is not present, the copy-forgery-inhibited pattern image is outputted as it is, as the combined image. The rasterization unit performs the combining processing in accordance with the setting for the watermark printing or the overlapped printing as shown in the radio button 410 in FIG. 4. The technique for the overlapped printing and the watermark printing is discussed in detail in Japanese Patent Application Laid-Open No. 2005-107777 and the like.

In this embodiment, a case is described where the host computer produces the original image and the copy-forgery-inhibited pattern image, and the printer 121 combines the original image and the copy-forgery-inhibited pattern image. However, the present invention is not limited to this case. For example, the host computer can combine the original image and the copy-forgery-inhibited pattern image. Then, the host computer converts the combined image into the print command so as to send the print command to the printer 121.

Next, in the image processing unit, a publicly known image processing such as color matching processing, RGB-CMYK conversion processing, and halftoning processing is performed. As described above, in this embodiment, the host computer produces the original image and the copy-forgery-inhibited pattern image. The printer 121 combines the original image and the copy-forgery-inhibited pattern image before performing the image processing. However, the present invention is not limited to this processing. For example, after the host computer performs the above image processing to the combined image, the host computer can convert the image that is already subjected to the image processing, into the print command so as to send the print command to the printer 121.

The image forming unit prints out the original in accordance with the information of the inputted combined image.

The image forming unit converts the combined image data that is bitmap data, into a video signal in order to output the video signal to a printer engine. The printer engine includes, for example, a mechanism for conveying a recording medium, a semiconductor laser unit, a photosensitive drum, a developing unit, a fixing unit, a drum cleaning unit, and a separation unit. The printer engine performs printing by a publicly known electrophotographic process. However, the present invention is not limited to this configuration. For example, instead of performing the image processing by the electrophotographic process, an inkjet printer, a laser beam printer, a thermal transfer printer, a dot impact printer, and an electrophotographic printer can be used.

The present invention can be applied also to a multifunction peripheral that includes an image reading device, an image processing device, and an image forming device within one machine. In this case, needless to say, the copy-forgery-inhibited pattern processing unit 205 according to this embodiment exists within the multifunction peripheral. When the present invention is applied to the multifunction peripheral, the copy-forgery-inhibited pattern image in which large and small dots are disposed in the latent image in a mixed state, can be combined with a copied original, instead of the original sent in a PDL format.

In the present invention, the user designates the background mixture rate (the rate of the small dots included in the latent image area). However, instead of that, the user can designate the rate of the large dots included in the latent image area.

The object of the present invention can also be achieved by a program code of software that causes the CPU to perform each step of the above flowchart, and a recording medium that stores the program code.

In this case, the program code itself, which is read from the recording medium, implements the function of the embodiment mentioned above, and accordingly, the recording medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2005-306648 filed Oct. 21, 2005 and 2006-196846 filed Jul. 19, 2006, which are hereby incorporated by reference herein in their entirety.

What is claimed is:

1. A method of controlling an apparatus capable of generating a copy-forgery-inhibited pattern image, the method comprising:

disposing dots to generate the copy-forgery-inhibited pattern image, such that the copy-forgery-inhibited pattern image includes a latent image area in which a plurality of first dots and a plurality of second dots smaller than the first dots are disposed and a background area in which a plurality of the second dots are disposed, the first dots can be reproduced when copied;

displaying information related to a disposition of the first dots in the latent image area and a disposition of the second dots in the latent image area;

setting a rate of the first dots that are disposed in the latent image area, or a rate of the second dots that are disposed in the latent image area, in accordance with a designation performed by a user; and disposing the first dots and the second dots in the latent image area in accordance with the setting of the rate, wherein the designation performed by the user causes the number of second dots disposed in the latent image to be increased and the number of the first dots disposed in the latent image to be decreased, so that a density of the latent image is substantially equal to a density of the background area.

2. The method according to claim 1, wherein the rate that is displayed by a display screen is changed in accordance with the designation performed by the user, and wherein, when the user designates a rate after a change as a setting value, the changed rate becomes the setting value.

3. The method according to claim 2, wherein the displaying of the information related to the disposition of the first dot and the second dot comprises displaying a copy-forgery-inhibited pattern image in a print product that is produced after determining the dot disposition, and an image in a copy of the print product.

4. The method according to claim 3, wherein the rate displayed on the display screen is changed in accordance with the designation performed by the user, and the copy-forgery-inhibited pattern image in the print product and the image in the copy of the print product that correspond to the rate after the change, are displayed on the display screen; and wherein, when the user designates the rate after the change as the setting value, the rate after the change becomes the setting value.

5. The method according to claim 2, wherein the displaying of information related to the disposition of the first dots and the second dots comprises displaying invisibility of a latent image in the print product produced after determining the dot disposition, and a visibility of the image in the copy of the print product.

6. The method according to claim 1, further comprising displaying information concerning a size of the first dots disposed in the latent image area.

7. The method according to claim 6, wherein the information concerning the size of the first dot displayed on the display screen is changed in accordance with the designation performed by the user, and wherein, when the user designates the displayed information concerning the size of the first dot after the change as the setting value, the information concerning the size of the first dot after the change becomes the setting value.

8. An apparatus that is capable of disposing dots to generate a copy-forgery-inhibited pattern image, the pattern image having a latent image area in which a plurality of first dots and a plurality of second dots smaller than the first dots are disposed and a background area in which a plurality of the second dots are disposed, the first dots can be reproduced when copied, the apparatus comprising:
- a displaying unit adapted to display information related to a disposition of the first dots in the latent image area and a disposition of the second dots in the latent image area;
- a setting unit adapted to set a rate of the first dots that are disposed in the latent image area, or a rate of the second dots that are disposed in the latent image area, in accordance with a designation performed by a user; and
- a dot disposing unit adapted to dispose the first and second dots in the latent image area in accordance with the setting of the rate,
- wherein the designation performed by the user causes the number of second dots disposed in the latent image to be increased and the number of the first dots disposed in the latent image to be decreased, so that a density of the latent image is substantially equal to a density of the background area.

9. The apparatus according to claim 8, wherein the setting unit changes the rate that is displayed on a display screen in accordance with the designation performed by the user, and
- wherein, when the user designates a rate after a change as a setting value, the changed rate becomes the setting value.

10. The apparatus according to claim 9, wherein the displaying unit displays a copy-forgery-inhibited pattern image in a print product produced by the dot disposition determination unit after determining the dot disposition, and an image in a copy of the print product.

11. The apparatus according to claim 10, wherein the setting unit changes the rate displayed on the display screen in accordance with the designation performed by the user using the display screen displayed on the display unit, and displays the copy-forgery-inhibited pattern image in the print product and the image in the copy of the print product that correspond to the rate after the change on the display screen; and
- wherein, when the user determinately designates the rate after the change as the setting value, the rate after the change becomes the setting value.

12. The apparatus according to claim 9, wherein the displaying unit displays invisibility of a latent image in the print product produced after determining the dot disposition and visibility of the image in the copy of the print product.

13. The apparatus according to claim 8, wherein the displaying unit displays information concerning a size of the first dot disposed in the latent image area on the display screen.

14. The apparatus according to claim 13, wherein the setting unit changes and displays on the display screen, the information concerning the size of the first dots displayed on the display screen in accordance with the designation performed by the user using the display screen displayed on the displaying unit, and
- wherein, when the user designates the information concerning the size of the first dot after the change as the setting value, the information concerning the size of the first dot after the change becomes the setting value.

15. A non-transitory computer-readable storage medium storing instructions which, when executed by an apparatus, causes the apparatus to perform operations comprising:
- receiving data for disposing dots to generate a copy-forgery-inhibited pattern image that includes a latent image area in which a plurality of first dots and a plurality of second dots are disposed and a background area in which a plurality of the second dots is disposed, the first dots are larger than the second dots and can be reproduced when copied;
- displaying information related to a disposition of the first dots in the latent image area and a disposition of the second dots in the latent image area;
- setting a rate of the first dots that are disposed in the latent image area, or a rate of the second dots that are disposed in the latent image area, in accordance with a designation performed by a user; and
- disposing the first dots and the second dots in the latent image area in accordance with the setting of the rate,
- wherein the designation performed by the user causes the number of second dots disposed in the latent image to be increased and the number of the first dots disposed in the latent image to be decreased, so that a density of the latent image is substantially equal to a density of the background area.

* * * * *